United States Patent
Aggarwal

(10) Patent No.: US 10,627,987 B2
(45) Date of Patent: Apr. 21, 2020

(54) METHOD FOR LAUNCHING A SECOND APPLICATION USING A FIRST APPLICATION ICON IN AN ELECTRONIC DEVICE

(71) Applicant: Samsung Electronics Co., Ltd., Suwon-si, Gyeonggi-do (KR)

(72) Inventor: Rahul Aggarwal, Dehradun (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 433 days.

(21) Appl. No.: 15/157,872

(22) Filed: May 18, 2016

(65) Prior Publication Data

US 2016/0342308 A1 Nov. 24, 2016

(30) Foreign Application Priority Data

May 19, 2015 (IN) .......................... 1412/DEL/2015

(51) Int. Cl.
G06F 3/0481 (2013.01)
G06F 3/0488 (2013.01)
G06F 3/048 (2013.01)

(52) U.S. Cl.
CPC ...... G06F 3/04817 (2013.01); G06F 3/04883 (2013.01)

(58) Field of Classification Search
CPC .. G06F 3/0482; G06F 3/04817; G06F 3/0488; G06F 3/0486; G06F 3/017; G06F 3/03547; G06F 3/04842
See application file for complete search history.

(56) References Cited

U.S. PATENT DOCUMENTS

| | | | |
|---|---|---|---|
| 2010/0269040 A1 | 10/2010 | Lee | |
| 2012/0260217 A1* | 10/2012 | Celebisoy | G06F 3/04815 715/836 |
| 2013/0120295 A1 | 5/2013 | Kim et al. | |
| 2013/0219346 A1* | 8/2013 | LeBeau | G06F 3/048 715/863 |
| 2013/0326418 A1 | 12/2013 | Utsuki et al. | |
| 2014/0317572 A1* | 10/2014 | Park | G06F 3/04817 715/835 |
| 2014/0380239 A1 | 12/2014 | Kang | |
| 2016/0179337 A1* | 6/2016 | Ballesteros | G06F 3/04817 715/773 |

FOREIGN PATENT DOCUMENTS

| | | |
|---|---|---|
| KR | 10-2014-0134377 A | 11/2014 |
| KR | 10-2014-0136746 A | 12/2014 |
| WO | 2014/204089 A1 | 12/2014 |

OTHER PUBLICATIONS

Jung et al., Effect of Tactile Display in Visually Guiding Input Device; 2006; IEEE; 6 pages.*
Indian Office Action dated Dec. 16, 2019, issued in counterpart Indian Patent Application No. 1412/DEL/2015.

* cited by examiner

*Primary Examiner* — Linh K Pham
(74) *Attorney, Agent, or Firm* — Jefferson IP Law, LLP

(57) ABSTRACT

A method for launching an application in an electronic device is provided. The method includes displaying an first application icon corresponding to an first application on the electronic device; detecting a first input performed on the displayed first application icon; and performing an action corresponding to the first input, in response to detecting the first input, and wherein the action corresponding to the first input comprises visually changing the first application icon.

12 Claims, 35 Drawing Sheets

FIG. 6C

| 604 | | | | | | | |
|---|---|---|---|---|---|---|---|
| Updating Calendar Application ..... | | | | | | | |
| Year | Month | Week | Day | Agenda | | | |
| < Sep | | | October 2014 | | | Nov > | |
| Sun | Mon | Tue | Wed | Thu | Fri | Sat | |
| 28 | 29 | 30 | 1 | 2 | 3 | 4 | 31 |
| 5 | 6 | 7 | 8 | 9 | (10) | 11 | |
| 12 | 13 | 14 | 15 | 16 | 17 | 18 | |
| 19 | 20 | 21 | 22 | 23 | 24 | 25 | Create events |
| 26 | 27 | 28 | 29 | 30 | 31 | 1 | |

METHOD FOR LAUNCHING A SECOND APPLICATION USING A FIRST APPLICATION ICON IN AN ELECTRONIC DEVICE

CROSS-REFERENCE TO RELATED APPLICATION(S)

This application claims the benefit under 35 U.S.C. § 119(a) of an Indian patent application filed on May 19, 2015 in the Indian Intellectual Property Office and assigned Serial number 1412/DEL/2015, the entire disclosure of which is hereby incorporated by reference.

TECHNICAL FIELD

The present disclosure relates to mobile applications. More particularly, the present disclosure relates to a method and system for launching a second application based on a gesture performed on an application icon corresponding to a first application in an electronic device.

BACKGROUND

Generally, almost all electronic devices display icons on a graphical user interface (GUI) for accessing folders, applications, programs or the like. Icons allow users to navigate and access content from the electronic device. Icons can be displayed as per user requirement on the display of the electronic device. Icons can be edited to change their appearance, location, or the like. On clicking on an application icon, the application is invoked and the user can then use the application. In some cases, the user may need to traverse through multiple pages to execute a function associated with the application.

In the existing systems of the related art, the mobile application icons are limited to launch only the corresponding application. The mobile application icons are used only as an entry point to use the application functionality. Thus, if a user wants to launch an associated program, the user must perform a plurality of actions, as the mobile application icons are limited only to the icon functionality, i.e., open the application. Therefore launching the associated program, for example application updates, KNOX mode, and private mode invocation for the application, is cumbersome for the user.

Moreover, though the application icon displays that updates are available for that application, the user cannot update the application through the same mobile application icon. In order to update the application, the user must traverse through a sequence of operations. Similarly, if the user wants to see the private data for a particular application such as gallery, then the user must explicitly switch on the KNOX mode and then open the gallery application to see the private data of the KNOX mode. Thus, many redundant operations are involved while invoking the associated program or application of the mobile application. Eventually, the user experience is degraded while accessing the mobile applications.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system for launching a second application based on a gesture performed on an application icon corresponding to a first application in an electronic device.

Another aspect of the present disclosure is to provide a method for detecting, by a controller module, a first input performed on a first application icon displayed on the electronic device, wherein the first application icon corresponds to a first application.

Another aspect of the present disclosure is to provide a method for detecting, by the controller module, a second input performed on the first application icon displayed on the electronic device.

Another aspect of the present disclosure is to launch, by the controller module, a second application associated with the first application.

Another aspect of the present disclosure is to simultaneously launch the first application along with the second application, wherein a second icon corresponding to the second application is displayed on a graphical user interface of the electronic device.

In accordance with an aspect of the present disclosure, a method for launching an application in an electronic device is provided. The method includes detecting, by a controller, a first input performed on a first application icon, wherein the first application icon corresponds to a first application, detecting, by the controller, a second input performed on the first application icon, and launching, by the controller, a second application associated with the first application in response to the detecting of the second input performed on the first application icon.

In accordance with another aspect of the present disclosure, an electronic device configured to launch an application is provided. The electronic device includes a controller configured to detect a first input performed on a first application icon displayed on the electronic device, wherein the first application icon corresponds to a first application, detect a second input performed on the first application icon displayed on the electronic device, and launch a second application associated with the first application.

In accordance with another aspect of the present disclosure, a computer readable non-transitory storage medium encoded with computer executable program code is provided. The computer executable program code when executed causes a computer to perform actions including detecting a first input performed on a first application icon displayed on an electronic device, wherein the first application icon corresponds to a first application. The actions further include detecting a second input performed on the first application icon displayed on the electronic device and launching a second application associated with the first application.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A to 6C illustrate an example scenario of launching a calendar application along with an update application in an electronic device using the rotate gesture and the tap gesture according to various embodiments of the present disclosure;

Throughout the drawings, it should be noted that like reference numbers are used to depict the same or similar elements, features, and structures.

DETAILED DESCRIPTION

Figure 1:
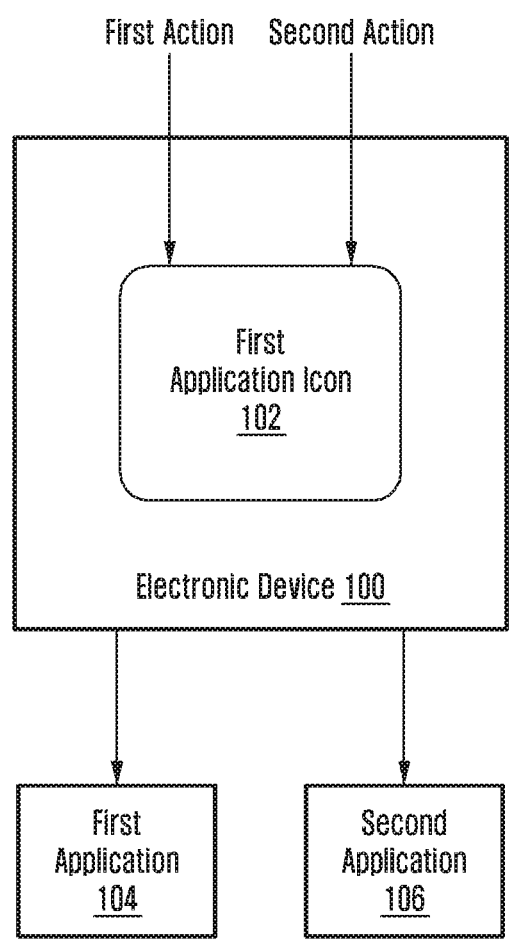
FIG. 1 illustrates a block diagram of an electronic device configured to launch an application in the electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments herein provide a method for launching an application in an electronic device. The method includes detecting, by a controller module, a first input performed on a first application icon displayed on the electronic device. The first application icon corresponds to a first application. Further, the method includes detecting, by the controller module, a second input performed on the first application icon displayed on the electronic device. On detection of the first input and the second input, a second application associated with the first application is launched.

The first application is simultaneously launched along with the second application. A second application icon corresponding to the second application is displayed on a graphical user interface of the electronic device.

In an embodiment, the first input results in a change in orientation, of the first application icon. The change in orientation of the first application icon indicates the second application. Further, in an embodiment, the change in orientation of the first application icon results in rearrangement of icons surrounding the first application icon. In an embodiment, the change in orientation of the first application icon results in resizing of icons surrounding the first application icon.

In an embodiment, a directive guidance or help document may indicate the second application. The directive guidance may suggest the user to choose the second application to be launched. The directive guidance may also suggest one or more actions to be performed in order to launch the second application.

In an embodiment, the first input includes at least one of a pattern of a gesture to be performed on the first application icon, and a type of gesture to be performed on the first application icon. The second input includes at least one of the patterns of a gesture to be performed on the second application icon, and the type of gesture to be performed on the second application icon.

In an embodiment, the second application is pre-associated with the first application by performing a third input on at least one of the first application icon and the second application icon corresponding to the second application. The third input includes at least one of the pattern of a gesture to be performed on the first application icon with respect to the second application icon, the pattern of a gesture to be performed on the second application icon with respect to the first application icon, the type of gesture to be performed on the first application icon with respect to the second application icon, or the type of gesture to be performed on the second application icon with respect to the first application icon.

In an embodiment, the third input includes at least one of the pattern of a gesture to be performed on the first application icon with respect to a location of a device corresponding to the second application, the type of gesture to be performed on the first application icon with respect to the location of the device corresponding to the second application.

Unlike the existing method and system of the related art, the disclosed system and method can be used to reduce the redundant operations involved in launching of two applications simultaneously. Thus, the processing power required by the electronic device for performing the redundant operations is also reduced.

Moreover, the disclosed method and system enhance the user experience as the user avoids performing redundant operations for launching two applications associated with each other. For example, if the user wants to open a message application and a music player application together, the user performs only two actions on the application icon of the message application. Thus, the user is prevented from performing redundant actions to open the music player application separately. Moreover, the system provides the user with an option to launch the second application associated with the first application. Thus, the user can control the launch of both the applications.

Further, the disclosed system and method can be used to overcome the limitation of launching only the application associated with the application icon. The disclosed system and method provide more capabilities to the application icons. The capabilities include launching of an associated second application or a secondary program, association of the first application with one or more second applications through detection of actions performed on the application icon, and the like.

Referring now to the drawings and more particularly to FIGS. 1 to 17 where similar reference characters denote corresponding features consistently throughout the figures, there are shown exemplary embodiments.

FIG. 1 illustrates a block diagram of an electronic device configured to launch an application in the electronic device according to various embodiments of the present disclosure.

An electronic device 100 described herein can be for example, a cellular phone, a smart phone, a wireless organizer, a personal digital assistant, a tablet, a handheld wireless communication device, a laptop, a desktop, and the like.

Referring to FIG. 1, an application icon 102 is displayed on a user interface of the electronic device 100. In an embodiment, the user may perform a first input followed by a second input on the application icon 102 (first application icon). The electronic device 100 can be configured to detect the first input on the application icon 102. The application icon 102 is associated with a first application 104. Further, the electronic device 100 can be configured to detect the second input. According to an embodiment, after the electronic device 100 detects the first input, the electronic device 100 may perform an action corresponding to the first input (for example, executing the first application and the second application) without detecting the second input.

After detecting the first input and the second input or after detecting releasing of the first input, the electronic device 100 can be configured to launch (or execute) the second application 106. In an embodiment, the electronic device 100 can be configured to launch (or execute) the first application 104 and the second application 106 simultaneously. For example, consider that the first application 104 is a gallery application. Also, consider that the user performs the first input 'rotation of a gallery application icon' and the second input 'click or tap on the gallery application icon'.

After detection of the rotate gesture and the tap gesture, the electronic device 100 can be configured to launch the gallery application and the second application 106 associated with the gallery application. In an embodiment, the first application 104 may be a main application that can be executed independently, and the second application 106 may be a sub application that can be executed with the first application 104 or a sub function relating to the first application 104. The second application 106 can include update of the gallery application, data backup of the gallery application, launching the gallery application in KNOX mode or Private mode, background pairing of a pre-defined favorite device with the electronic device 100 thereby enabling the gallery application to share the data with the favorite device, or sharing of data on the electronic device 100 with another device using short range communication.

In an embodiment, the electronic device 100 may perform a sub function of the first application 104 in response to the releasing of the first input. For example, the electronic device 100 may execute the first application 104 normally when touch input is detected without the first input (for example, a rotation of the first application icon). On the other hand, the electronic device 100 may execute the predetermined sub function of the first application 104 when the first input is detected and released. The sub function may include an update or backup of data, and so on.

In an embodiment, the electronic device 100 may execute the first application 104 with changing an operation mode and/or an environment setting preconfigured to the first input. For example, the electronic device 100 may execute the first application 104 with the original operation mode and/or an environment setting when a touch input is detected without the first input. On the other hand, the electronic device 100 may execute the first application 104 with changing the operation mode and/or the environment setting based on properties of the first input (for example, the degree of rotation of the first input) when the first input is detected and released. The operation mode may include a KNOX mode and private mode. The environment setting may include enabling the first application 104 to share the data relating to the first application 104 with another device by paring with the another device, and various setting values according to the properties of an application, for example, size and/or resolution value of the screen and whether executing the application in the background or foreground.

In an embodiment, the electronic device 100 may execute a basic function (for example, an execution of the gallery application) of the first application 104 when a touch input on the first application icon is detected while the first application icon is not changed visually due to the first input not being detected. On the other hand, the electronic device 100 may execute a sub function (for example, an update of a backup of data of the gallery application) of the first application 104 when a second input is detected after the first input is detected and the first application icon is visually changed.

In an embodiment, consider that the electronic device 100 includes a multi-window feature. After detection of the first input and the second input, the first application 104 may be launched in one window and the second application 106 may be launched in another window on the electronic device 100. In an embodiment, the first application 104 may be executed in the foreground and the second application 106 may be executed in the background. The method to execute the first application 104 and the second application 106 (for example, an execution with a multi-window or execution in the background and foreground) can be determined by the setting of the electronic device 100 or properties of the first application 104 and the second application 106.

In an embodiment, the electronic device 100 may change the first application icon visually. The visual change may include various ways, for example, such as changing the orientation of the first application icon, highlighting the first application icon, and stretching the length and/or width of the first application icon.

In an embodiment, the first input may result in a change in the orientation of the first application icon 102. For example, consider that the first input is a long press on the first application icon 102. After performing the long press action, the orientation of the first application icon 102 may change (for example, the first application icon 102 may get stretched).

Further, in an embodiment, the change in orientation of the first application icon 102 results in rearrangement of icons surrounding the first application icon 102. For example, after performing the long press on the first application icon 102, the first application icon 102 gets stretched and the application icons surrounding the first application icon 102 may be displayed in a form of a ring surrounding the first application icon 102.

In another embodiment, the change in orientation of the first application icon 102 results in resizing of icons surrounding the first application icon 102. For example, after the stretching of the first application icon 102, the size of the application icons surrounding the first application icon 102 may get reduced in order to provide focus on the first application icon 102.

Further, the change in orientation of the first application icon 102 indicates the second application 106. For example, if the first application icon 102 is stretched and the application icons surrounding the first application icon 102 are displayed in form of the ring surrounding the first application icon 102, the application icons in the ring may indicate the second application 106. At least one application from the applications in the ring may act as the second application 106. The user may associate the second application 106 with the first application 104 by dragging the first application icon 102 over one of the application icons present in the ring. Further, a second input may be performed on the first application icon 102 to launch the first application 104 and the second application 106 simultaneously.

After detecting the long press and the drag of the first application icon 102 over one of the application icons, the electronic device 100 may be configured to launch the first application 104 and the second application 106 simultaneously. Thus, the user experience is enhanced as the user is prevented from performing redundant operations for launching two applications associated with each other.

In an embodiment, the first input may be a pattern of a gesture to be performed on the first application icon 102. The pattern of a gesture may be a combination of gestures forming a pattern. For example, the first input may include a long press and a drag action performed on the first application icon 102 to move the first application icon 102 from a first position on the user interface to a second position on the user interface.

In an embodiment, the first input may be a type of gesture to be performed on the first application icon 102. For example, the type of gesture may be the rotate gesture performed on the first application icon 102, a long press performed on the first application icon 102, a drag action performed on the first application icon 102, a tap on the first application icon 102, and the like.

The second input includes at least one of the patterns of a gesture to be performed on the first application icon 102, and the type of gesture to be performed on the first application icon 102. The pattern of a gesture may be two tap gestures performed on the first application icon 102 to form a pattern of two tap gestures.

The type of gesture to be performed on the first application icon 102 may include the rotate gesture performed on the first application icon 102, the long press performed on the first application icon 102, the drag action performed on the first application icon 102, the tap on the first application icon 102, and the like.

In an embodiment, the second application 106 is pre-associated with the first application 104 by performing a third input on at least one of the first application icon 102 and a second application icon corresponding to the second application 106. In the present disclosure, the first application 104 being pre-associated with the second application may mean that the first application 104 and the second application 106 may be executed concurrently in response to the detected input (for example, first input and/or second input). The third input includes at least one of the pattern of a gesture to be performed on the first application icon 102 with respect to the second application icon, the pattern of a gesture to be performed on the second application icon with respect to the first application icon 102, the type of gesture to be performed on the first application icon 102 with respect to the second application icon, or the type of gesture to be performed on the second application icon with respect to the first application icon 102.

For example, consider that the first application 104 is a message application and the second application 106 is a music player application. The music player application may be pre-associated with the message application by performing the third input. The third input may include the rotate gesture performed on the first application icon 102, the long press performed on the first application icon 102, the drag action performed on the first application icon 102, the tap gesture on the first application icon 102, or the like. For example, the music player application may be pre-associated with the message application by the long press on the message application icon and dragging the message application icon over the music player application icon. Similarly, the pattern of the gesture, including the long press and drag action, may be performed on the music player application icon.

In an embodiment, the message application may be configured to be pre-associated with the music player application by performing the type of gesture on the first application icon 102 or the second application icon.

In an embodiment, the third input may include dragging the first application icon to a predetermined region (for example, the edge screen of the display 210) on a screen of the electronic device 100 and dragging at least one second application icon to a predetermined region. The electronic device 100 may associate a first application corresponding to the first application icon dragged to the predetermined region with at least one second application corresponding to the at least one second application icon dragged to the predetermined region.

In an embodiment, the third input may include touch input performed on the first application icon. The electronic device 100 may display a list of at least one second application icon corresponding to at least one second application that can be associated with the first application, in response to the touch input.

In an embodiment, the third input includes at least one of the pattern of a gesture to be performed on the first application icon 102 with respect to a location of a device corresponding to the second application 106, or the type of gesture to be performed on the first application icon 102 with respect to the location of the device corresponding to the second application 106. Consider that the first application 104 is the message application and the second application 104 is an application associated with any home networking device paired or connected with the electronic device 100. The connected devices are displayed on the user interface of the electronic device 100 based on locations of the home networking devices relative to the electronic device 100. The location of the home networking devices may be detected, for example, based on the direction of the location of the home networking devices by magnetic sensors installed in the electronic device 100.

The second applications associated with the connected home networking devices may include a home theatre application, a screen mirroring application in a television, and the like. The connected home networking devices may include the television, a refrigerator, a washing machine, a camera, and the like.

Unlike the existing method and system of the related art, the electronic device 100 can be configured to reduce the redundant operations involved in launching of two applications simultaneously. Thus, the processing power required by the electronic device 100 for detecting the redundant operations is also reduced.

Moreover, the electronic device 100 can be configured to enhance the user experience as the user is prevented from performing redundant operations for launching two applications associated with each other. Thus, the user is prevented from performing redundant actions to open, for example, the music player application separately from the message application. Moreover, the electronic device 100 can be configured to provide the user with an option to launch the second application 106 associated with the first application 104. Thus, the user can control the launch of both the applications.

Further, the electronic device 100 can be configured to overcome the limitation of only launching the application associated with the application icon. The electronic device 100 can be configured to provide more capabilities to the application icons. The capabilities includes launching of an associated second application 106 or a secondary program, association of the first application 104 with one or more second applications 106 through detection of actions performed on the application icon, and the like.

FIG. 1 illustrates a limited overview of the electronic device 100, but it is to be understood that other embodiments are not limited thereto. The labels provided to each module or component are only for illustrative purpose and do not limit the scope of the disclosure. Further, the one or more modules can be combined or separated to perform similar or substantially similar functionalities without departing from the scope of the disclosure. Furthermore, the electronic device 100 can include various other modules or components interacting locally or remotely along with other hardware or software components to communicate with each other. For example, the component can be, but is not limited to, a process running in the controller or processor, an object, an executable process, a thread of execution, a program, or a computer.

Figure 2:
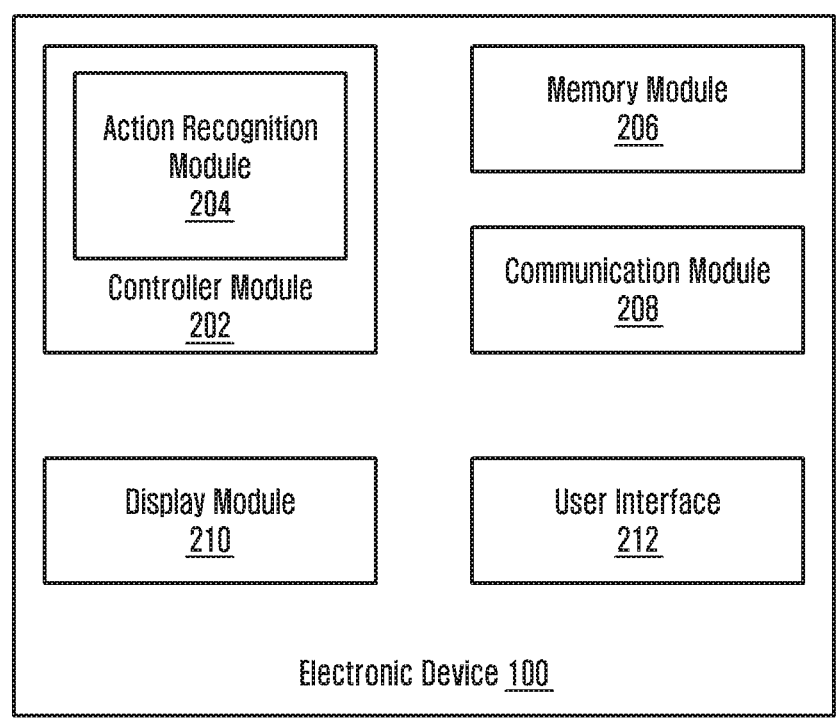
FIG. 2 illustrates another block diagram of an electronic device configured to launch the application in the electronic device according to various embodiments of the present disclosure.

FIG. 2 illustrates another block diagram of an electronic device configured to launch an application in the electronic device according to various embodiments of the present disclosure.

Referring now to FIG. 2, an electronic device 100 can be configured to include a controller module 202, a memory module 206, a communication module 208, a display module 210, and a user interface 212. The controller module 202 can be configured to include an action recognition module 204. The modules described herein may be implemented with specialized hardware such as a processor, general purpose hardware configured or programmed to perform specific functions, or a combination thereof.

The memory module 206 can be configured to store the data generated or received by the electronic device 100. The memory module 206 can also be configured to store at least one second application 106 associated with the first application 104.

Further, the communication module 208 can be configured to enable communication between the electronic device 100 and one or more devices paired or connected with the electronic device 100. The display module 210 can be configured to display the application icons corresponding to the applications on the user interface 212 of the electronic device 100. The display module 210 can also be configured to display the modification in application icon based on the first input or the second input based on a control signal of the controller module 202.

The controller module 202 can be configured to detect the first input performed on the first application icon 102. The first application icon 102 may be associated with the first application 104. Further, the controller module 202 can be configured to detect the second input performed on the first application icon 102. Further, the controller module 202 can be configured to launch the second application 106 on detection of the first input and/or the second input. In an embodiment the action recognition module 204 can be configured to detect the first input and the second input performed on the first application icon 102 or the second application icon.

In an embodiment, the controller module 202 can be configured to simultaneously launch the first application 104 along with the second application 106. Further, the second application icon corresponding to the second application 106 is displayed on the user interface 212 of the electronic device 100.

In an embodiment, the first input may result in a change in orientation of the first application icon 102. The change in orientation of the first application icon 102 may indicate the second application 106. Further, in an embodiment, the change in orientation of the first application icon 102 may result in rearrangement of icons surrounding the first application icon 102. In another embodiment, the change in orientation of the first application icon 102 may result in resizing of icons surrounding the first application icon 102.

In an embodiment, the first input may include at least one of a pattern of a gesture to be performed on the first application icon 102 and a type of the gesture to be performed on the first application icon 102. The second input may include at least one of the pattern of a gesture to be performed on the second application icon and a type of the gesture to be performed on the second application icon.

In an embodiment, the second application 106 may be configured to be pre-associated with the first application 104 by performing the third input on the first application icon 102 and the second application icon corresponding to the second application 106. The third input may include at least one of a pattern of a gesture to be performed on the first application icon 102 with respect to the second application icon, a pattern of a gesture to be performed on the second application icon with respect to the first application icon 102, a type of the gesture to be performed on the first application icon 102 with respect to the second application icon, and a type of the gesture to be performed on the second application icon with respect to the first application icon 102.

In an embodiment, the third input may include at least one of a pattern of a gesture to be performed on the first application icon 102 with respect to the location of the device corresponding to the second application, and a type of the gesture to be performed on the first application icon 102 with respect to the location of the device corresponding to the second application 106.

Unlike the existing method and system of the related art, the electronic device 100 can be configured to reduce the redundant operations involved in launching of two applications simultaneously. Thus, the processing power required by the electronic device 100 for detecting the redundant operations is also reduced.

Moreover, the electronic device 100 can be configured to enhance the user experience as the user is prevented from performing redundant operations for launching two applications associated with each other. Thus, the user is prevented from performing redundant actions to open, for example, the music player application separately from the message application. Moreover, the electronic device 100 can be configured to provide the user with an option to launch the second application 106 associated with the first application 104. Thus, the user can control the launch of both the applications.

FIG. 2 illustrates a limited overview of the electronic device 100 but, it is to be understood that other embodiments are not limited thereto. The labels provided to each module or component are only for illustrative purpose and do not limit the scope of the disclosure. Further, the one or more modules can be combined or separated to perform the similar or substantially similar functionalities without departing from the scope of the disclosure. Furthermore, the electronic device 100 can include various other modules or components interacting locally or remotely along with other hardware or software components to communicate with each other. For example, the component can be, but is not limited to, a process running in the controller or processor, an object, an executable process, a thread of execution, a program, or a computer.

Figure 3:
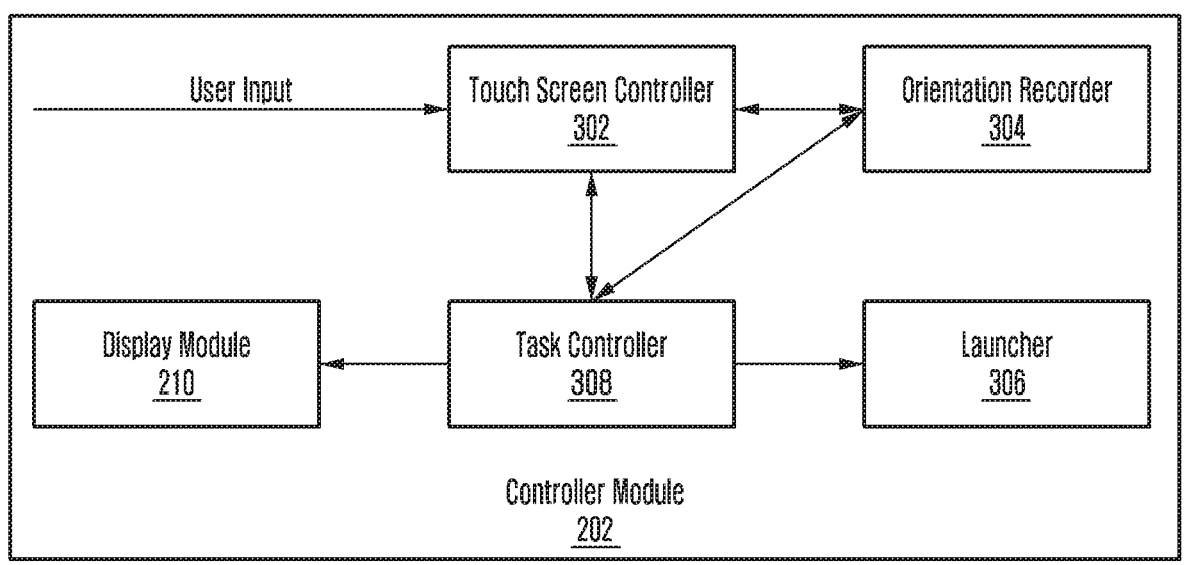
FIG. 3 illustrates a block diagram of a controller module configured to launch the application in the electronic device according to various embodiments of the present disclosure.

FIG. 3 illustrates a block diagram of a controller module configured to launch an application in an electronic device according to various embodiments of the present disclosure.

Referring to FIG. 3, in an embodiment, the controller module 202 can be configured to include a touch screen controller 302, an orientation recorder 304, a launcher 306, a task controller 308, and the display module 210.

The touch screen controller 302 can be configured to receive a user input. In an embodiment, the user input may be at least one of the first input and the second input performed on the first application icon 102. For example, consider that the first input is the rotate gesture and the second input is the tap gesture performed on the contacts application icon. The orientation recorder 304 can be configured to detect if the rotate gesture is performed on the contacts application icon. If the rotate gesture is performed on the contacts application icon, the orientation recorder 304 can be configured to communicate the rotation to the task controller 308.

The task controller 308 can be configured to determine the second application 106 to be launched based on detection of the rotate gesture on the contacts application icon. The task controller 308 can recognize that the contacts application and data backup application are pre-associated with the third input. The task controller 308 provides input to the launcher 306 regarding the second application 106 to be launched. Further, the task controller 308 can be configured to provide an input to the display module 210 for returning the contacts application icon to its original orientation for further invocation of the contacts application. The display module 210, based on the input provided by the task controller 308, modifies the orientation of the contacts application icon to its original orientation.

Further, the launcher 306 can be configured to launch the second application 106 based on the input provided by the task controller 308. For example, consider that the task controller 308 determines that the second application 106 to be launched is a data backup of the contacts in the contacts application. The launcher 306 can be configured to launch the data backup program based on the input provided by the task controller 308.

In an embodiment, the launcher 306 can be configured to launch the contacts application along with the data backup program. Thus, the contacts application icon can be provided with more than one function or capability. Unlike the existing systems of the related art, the contacts application icon can be associated with launching of more than one application based on the actions performed by the user.

FIG. 3 illustrates a limited overview of the controller module 202 but, it is to be understood that other embodiments are not limited thereto. The labels provided to each module or component are only for illustrative purpose and do not limit the scope of the disclosure. Further, the one or more modules can be combined or separated to perform the similar or substantially similar functionalities without departing from the scope of the disclosure. Furthermore, the controller module 202 can include various other modules or components interacting locally or remotely along with other hardware or software components to communicate with each other. For example, the component can be, but is not limited to, a process running in the controller or processor, an object, an executable process, a thread of execution, a program, or a computer.

Figure 4:
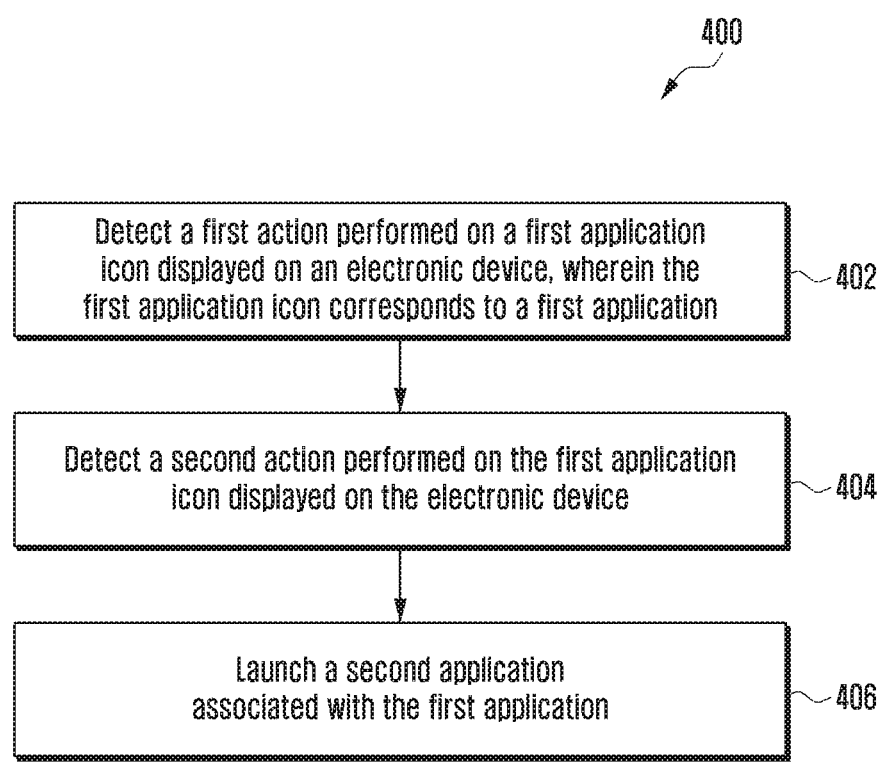
FIG. 4 is a flow diagram illustrating a method to launch the application in the electronic device according to various embodiments of the present disclosure.

FIG. 4 is a flow diagram illustrating a method for launching an application in an electronic device according to various embodiments of the present disclosure.

Referring to FIG. 4, at operation 402, the method 400 includes detecting, by the controller module 202, the first input performed on the first application icon 102 displayed on the electronic device 100. The first application icon 102 corresponds to the first application 104. Further, at operation 404, the method 400 includes detecting, by the controller module 202, the second input performed on the first application icon 102 displayed on the electronic device 100. On detection of the first input and the second input, at operation 406, the method 400 includes launching the second application 106 associated with the first application 104. In an embodiment, the electronic device 100 may execute the second application 106, in response to detecting the release of the first input.

Further, the method 400 includes simultaneously launching the first application 104 along with the second application 106. A second icon corresponding to the second application 106 is displayed on a graphical user interface of the electronic device 100.

In an embodiment, the first input results in a change in orientation of the first application icon 102. The change in orientation of the first application icon 102 indicates the second application 106. Further, in an embodiment, the change in orientation of the first application icon 102 results in rearrangement of icons surrounding the first application icon 102. In another embodiment, the change in orientation of the first application icon 102 results in resizing of icons surrounding the first application icon 102.

In an embodiment, the first input includes at least one of a pattern of a gesture to be performed on the first application icon 102, and a type of the gesture to be performed on the first application icon 102. The second input includes at least one of a pattern of a gesture to be performed on the second application icon, and a type of the gesture to be performed on the second application icon.

In an embodiment, the second application 106 is configured to be pre-associated with the first application 104 by performing the third input on the first application icon 102 and the second application icon corresponding to the second application 106. In the present disclosure, the first application 104 being pre-associated with the second application may mean the first application 104 and the second application 106 may be executed concurrently in response to the detected input (for example, first input and/or second input). The third input includes at least one of a pattern of a gesture to be performed on the first application icon 102 with respect to the second application icon, a pattern of a gesture to be performed on the second application icon with respect to the first application icon 102, a type of the gesture to be performed on the first application icon 102 with respect to the second application icon, and a type of the gesture to be performed on the second application icon with respect to the first application icon 102.

In an embodiment, the third input includes at least one of a pattern of a gesture to be performed on the first application icon 102 with respect to the location of the device corresponding to the second application 106 and a type of the gesture to be performed on the first application icon 102 with respect to the location of the device corresponding to the second application 106.

Unlike the existing method and system of the related art, the method 400 reduces the redundant operations involved in launching of two applications simultaneously. Thus, the processing power required by the electronic device 100 for performing the redundant operations is also reduced.

Moreover, the method 400 enhances the user experience as the user is prevented from performing redundant operations for launching two applications associated with each other. For example, if the user wants to open a message application and music player application together, the user performs two actions on the same application icon of the message application. Thus, the user is prevented from performing redundant actions to open the music player application separately from the message application.

The various actions, acts, blocks, operations, and the like in the method 400 may be performed in the order presented, in a different order, or simultaneously. Further, in various embodiments, some of the actions, acts, blocks, operations, and the like may be omitted, added, modified, skipped, and the like without departing from scope of the disclosure.

Figure 5:
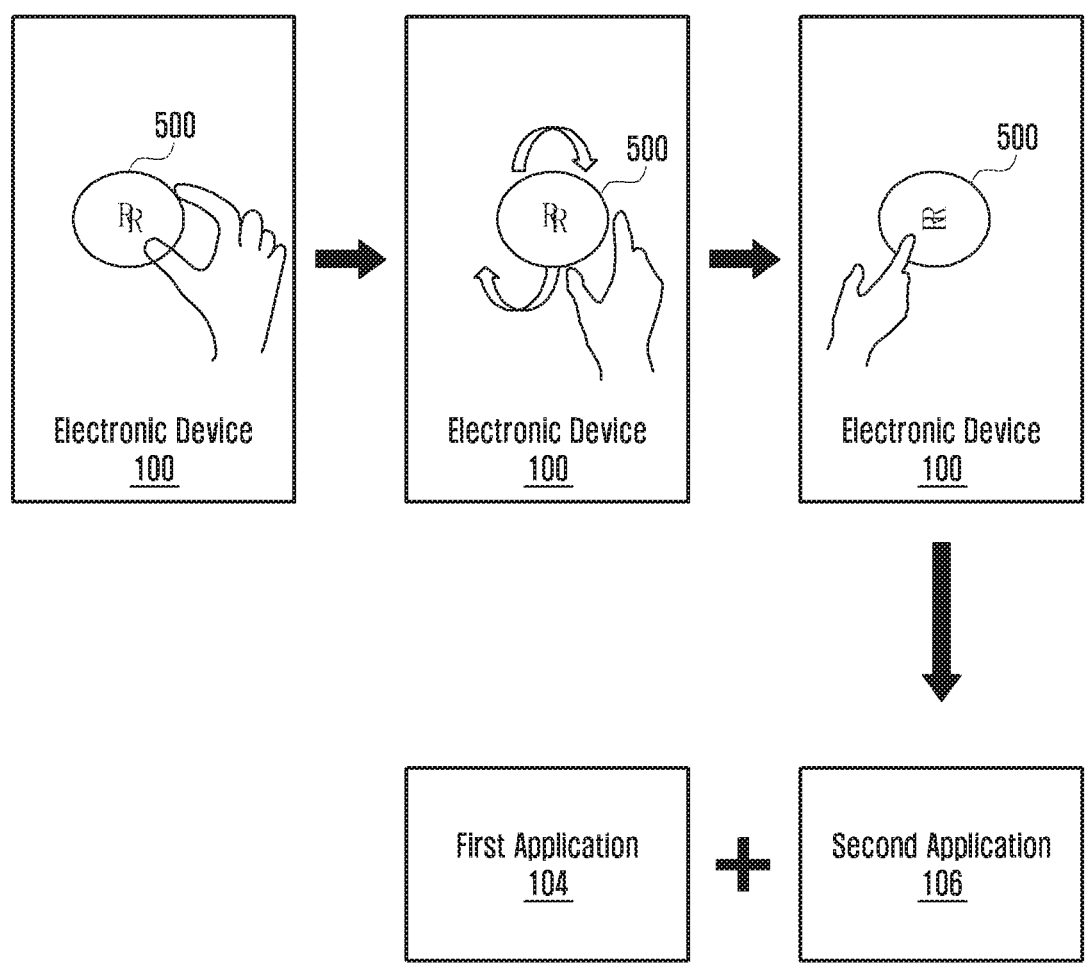
FIG. 5 illustrates an example scenario of launching a first application along with a second application in an electronic device using a rotate gesture and a tap gesture according to various embodiments of the present disclosure.

FIG. 5 illustrates an example scenario of launching a first application along with a second application in an electronic device using a rotate gesture and a tap gesture according to various embodiments of the present disclosure.

Referring to FIG. 5, the first input of the rotate gesture is performed on the application icon 500. The application icon 500 is associated with the first application 104. Further, the second input of the tap gesture is performed on the rotated application icon 500. The electronic device 100 detects the rotate gesture and the tap gesture and launches the second application 106 associated with the first application 104. In an embodiment, the first application 104 can be launched simultaneously with the second application 106 in response to detecting the first input and/or second input.

In an embodiment, the electronic device 100 may execute the first application 104 and the second application 106 when a touch is released after a rotate gesture greater than a predetermined degree.

Figure 6A:
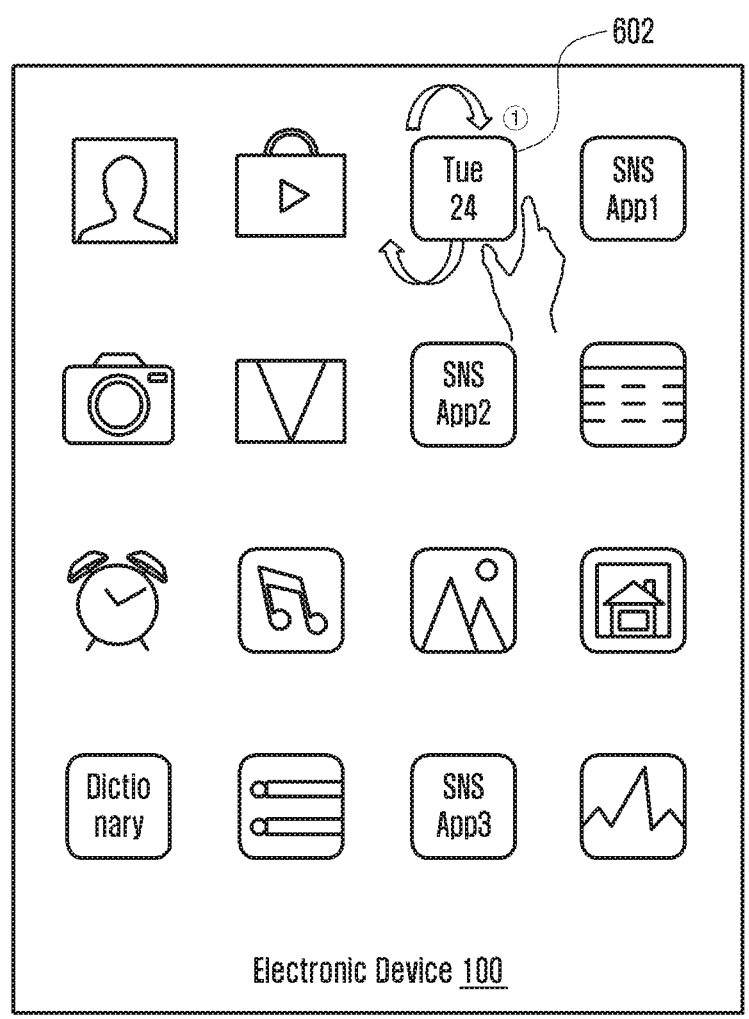
Figure 6B:
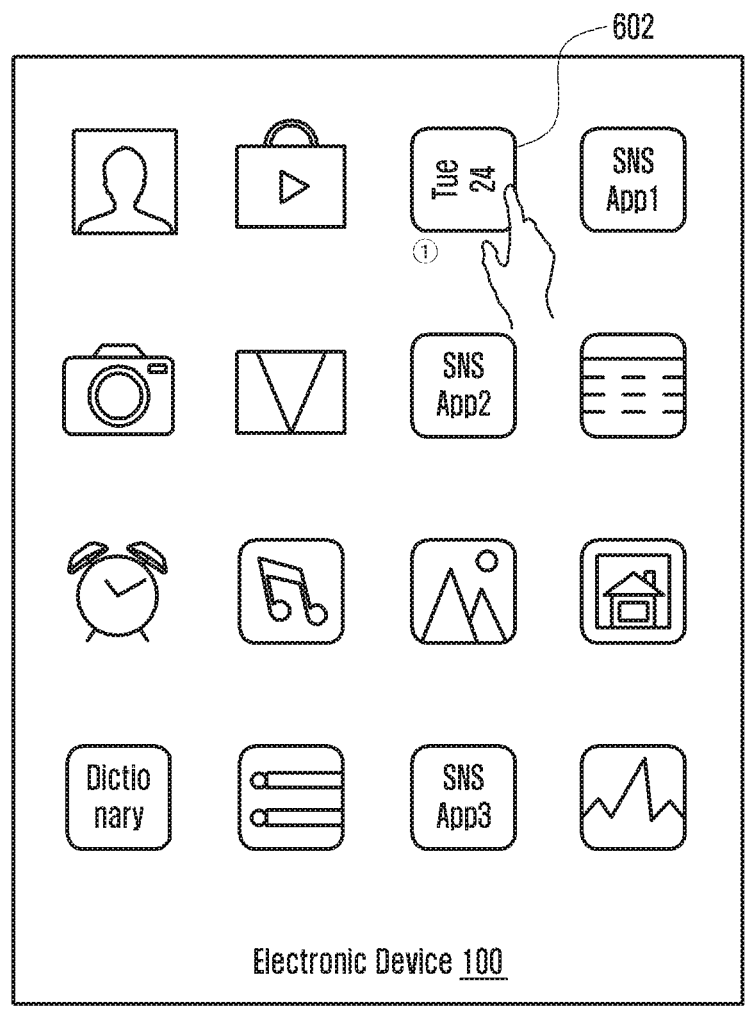

FIGS. 6A to 6C illustrate an example scenario of launching a calendar application along with an update application in an electronic device using a rotate gesture and a tap gesture according to various embodiments of the present disclosure.

Referring to FIG. 6A, the calendar application icon 602 is modified to display that an update is available. The first input of the rotate gesture is performed on the calendar application icon 602, and the calendar application icon 602 can be rotated 90 degrees. Further, referring to FIG. 6B, the second input of the tap gesture is performed on the rotated calendar application icon 602.

Further, referring to FIG. 6C, after detection of the rotate gesture and the tap gesture, the calendar application 604 and the update application associated with the calendar application 604 are launched simultaneously. Referring to FIG. 6C, while the calendar application 604 is open, the calendar application 604 is updated in the background. Thus, the redundant operations required to update the calendar application 604 are eliminated, thereby enhancing the user experience and reducing the processing power usage of the electronic device 100.

In an embodiment, when the rotate gesture on the calendar application is released, the execution and update of the calendar application can be performed concurrently.

FIGS. 7A to 7D illustrates an example scenario of launching a gallery application along in a KNOX mode, in an electronic device using a rotate gesture and a tap gesture according to various embodiments of the present disclosure.

Figure 7A:
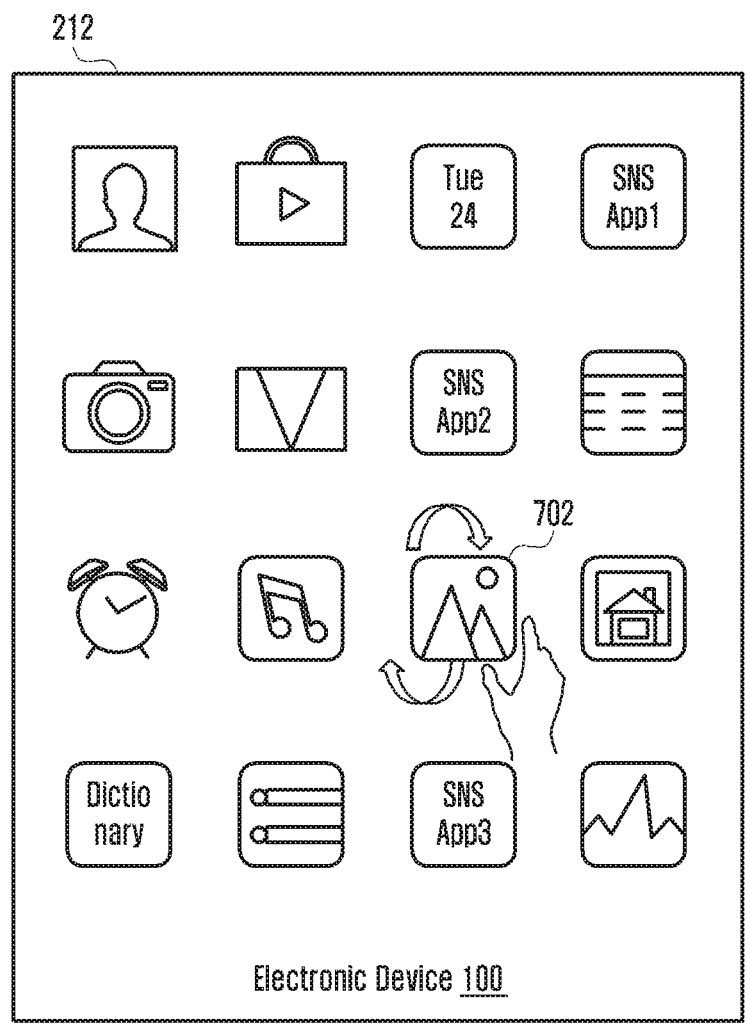
FIGS. 7A to 7D illustrate an example scenario of launching a gallery application along with at least one of a KNOX mode and private mode, in an electronic device using the rotate gesture and the tap gesture according to various embodiments of the present disclosure.

Referring to FIG. 7A, the gallery application icon 702 is displayed on the user interface 212 of the electronic device 100. The first input of the rotate gesture is performed on the gallery application icon 702. The orientation of the gallery application icon 702 may changed in response to detecting of the first input.

Figure 7B:
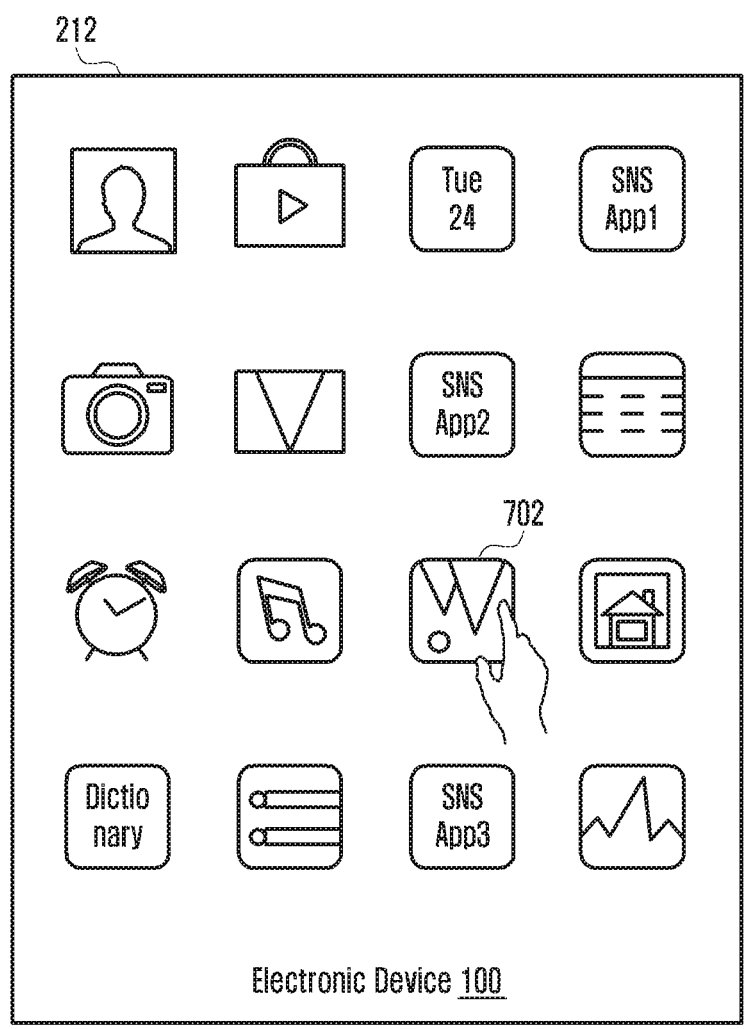

Further, referring to FIG. 7B, second input of the tap gesture is performed on the rotated gallery application icon 702.

Figure 7C:
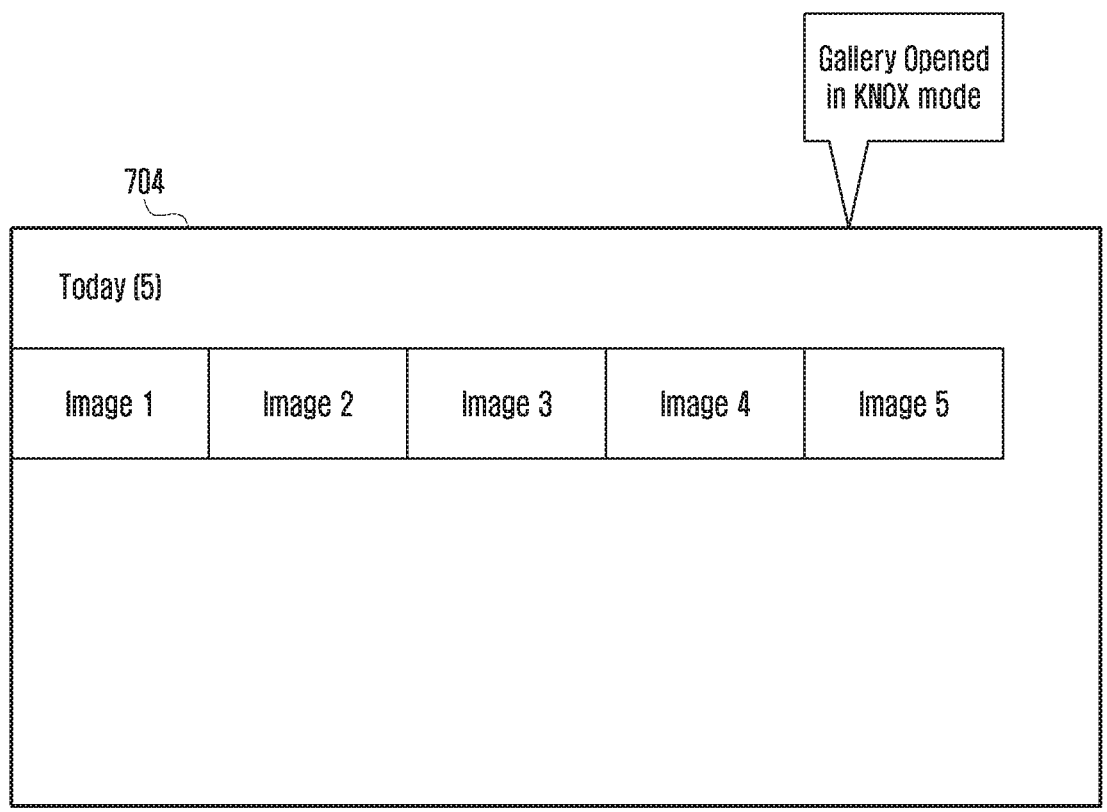

Further, referring to FIG. 7C, after detection of the rotate gesture and the tap gesture, the gallery application 704 is launched in the KNOX mode. The KNOX mode is the second application 106 associated with the gallery application 704.

Figure 7D:
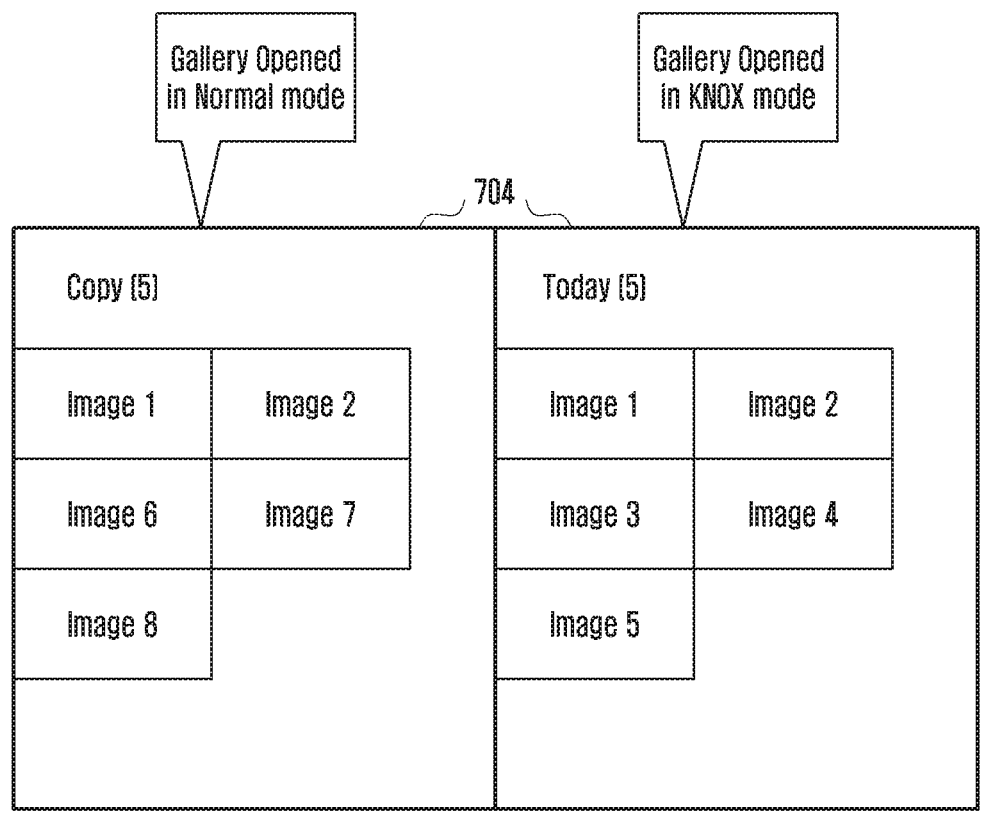

In an embodiment, referring to FIG. 7D, after detection of the rotate gesture and the tap gesture, the gallery application 704 is launched in the KNOX mode and the normal mode simultaneously. In an embodiment, the normal mode Gallery application 704 and Knox mode Gallery application 704 may be launched in a multi-window display environment.

In an embodiment, the first application 104 may be executed in the foreground and the second application 106 may be executed in the background, as disclosed by FIGS. 6A to 6C. Further, the first application 104 and the second application 106 may executed by the multi window environment. In an embodiment, the method to execute the first application 104 and the second application 106 (for example, an execution with a multi-window or execution in the background and foreground) can be determined by the setting of the electronic device 100 or properties of the first application 104 and the second application 106. For example, if the second application 106 is an update application, the electronic device 100 may perform updating the gallery application in the background, because the update application can be executed on the background, and if the second application 106 is a KNOX mode application, the gallery applications with normal mode and KNOX mode may be executed in the multi window, because the KNOX mode application can be executed concurrently with the first application.

FIGS. 8A to 8D illustrate an example scenario of launching a contacts application along with at least one second application in an electronic device according to various embodiments of the present disclosure.

In an embodiment, the third input for associating the first application 104 with the second application 106 may include dragging the first application icon to a predetermined region (for example, the edge screen) on a screen of the electronic device, and dragging the second application icon to a predetermined region.

Figure 8A:
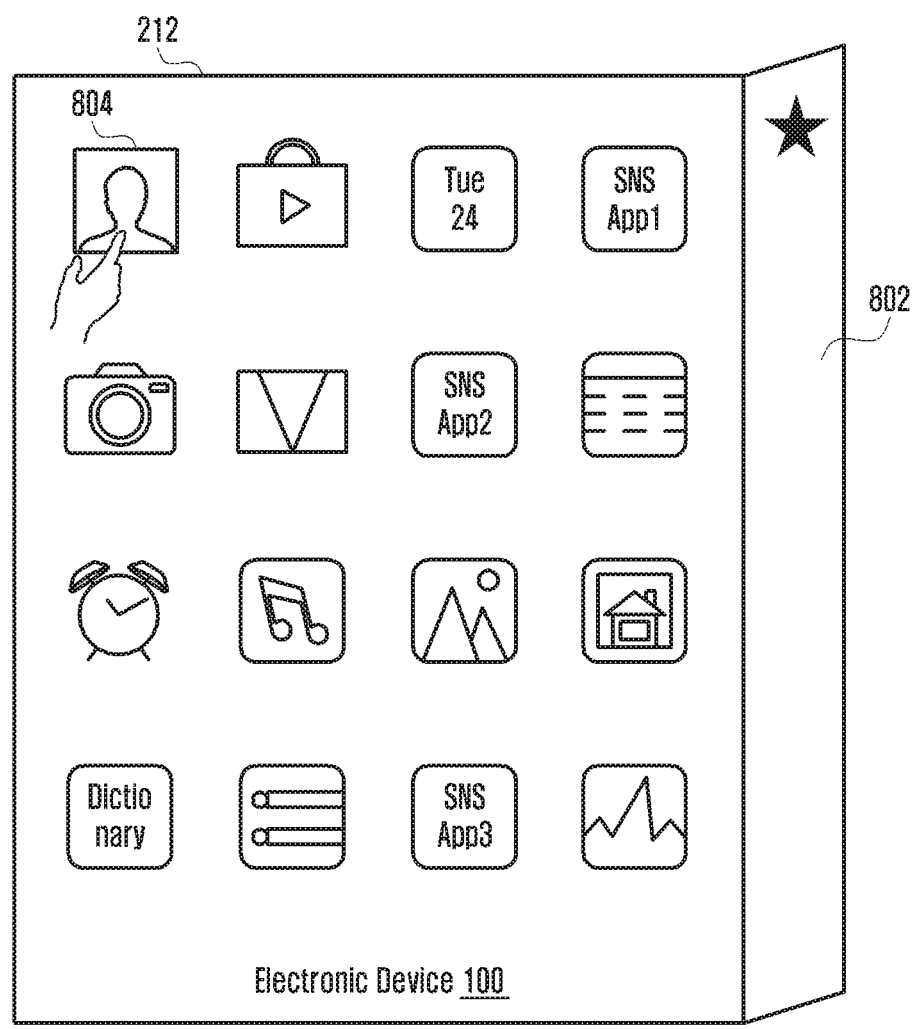
FIGS. 8A to 8D illustrate an example scenario of launching a contacts application along with at least one second application in an electronic device according to various embodiments of the present disclosure.

Referring to FIG. 8A, the electronic device 100 is an electronic device 100 with an edge screen 802. After performing the first input of long press on the contacts application icon 804, the edge screen 802 is highlighted (indicated by a star symbol at the top portion of the edge screen 802). In an embodiment, a nearest edge screen 802 relative to the position of the contacts application icon 804 may be highlighted or activated, if the electronic device 100 comprises a dual edge display.

Figure 8B:
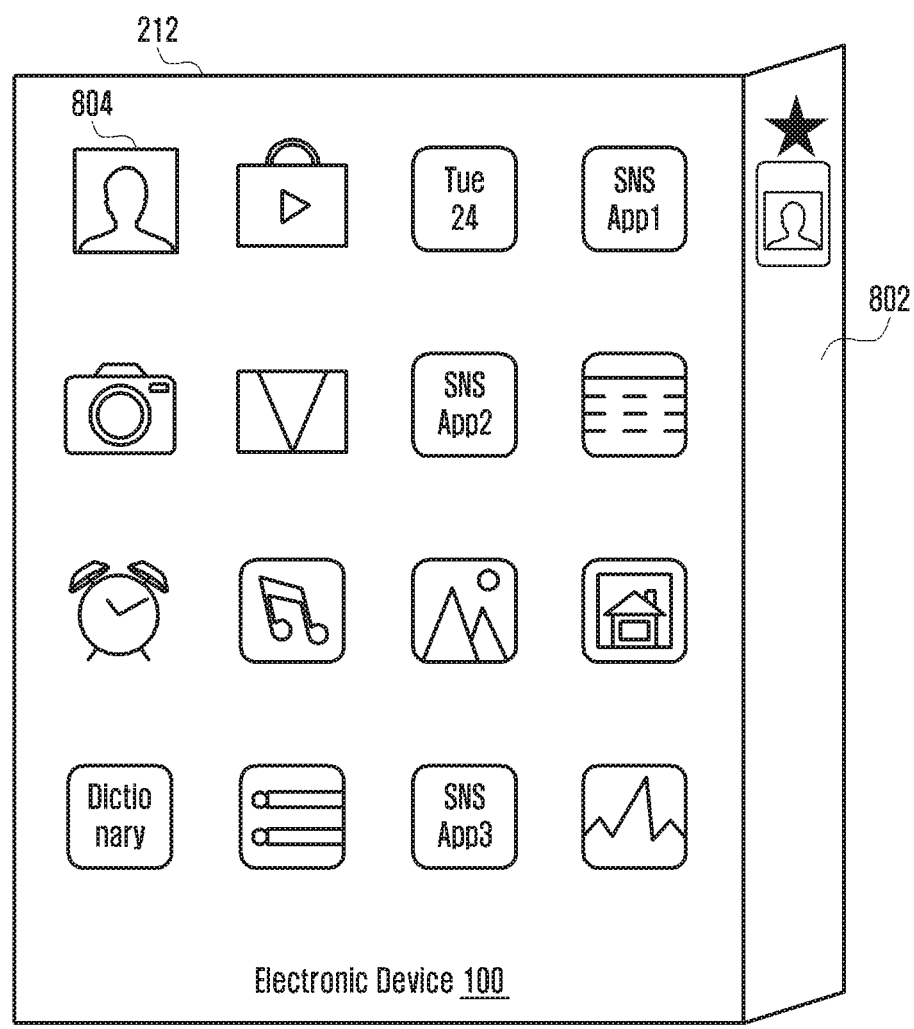

Further, referring to FIG. 8B, the contacts application icon 804 is dragged to the edge screen 802 by performing the first input also including the drag action on the contacts application icon 804.

Figure 8C:
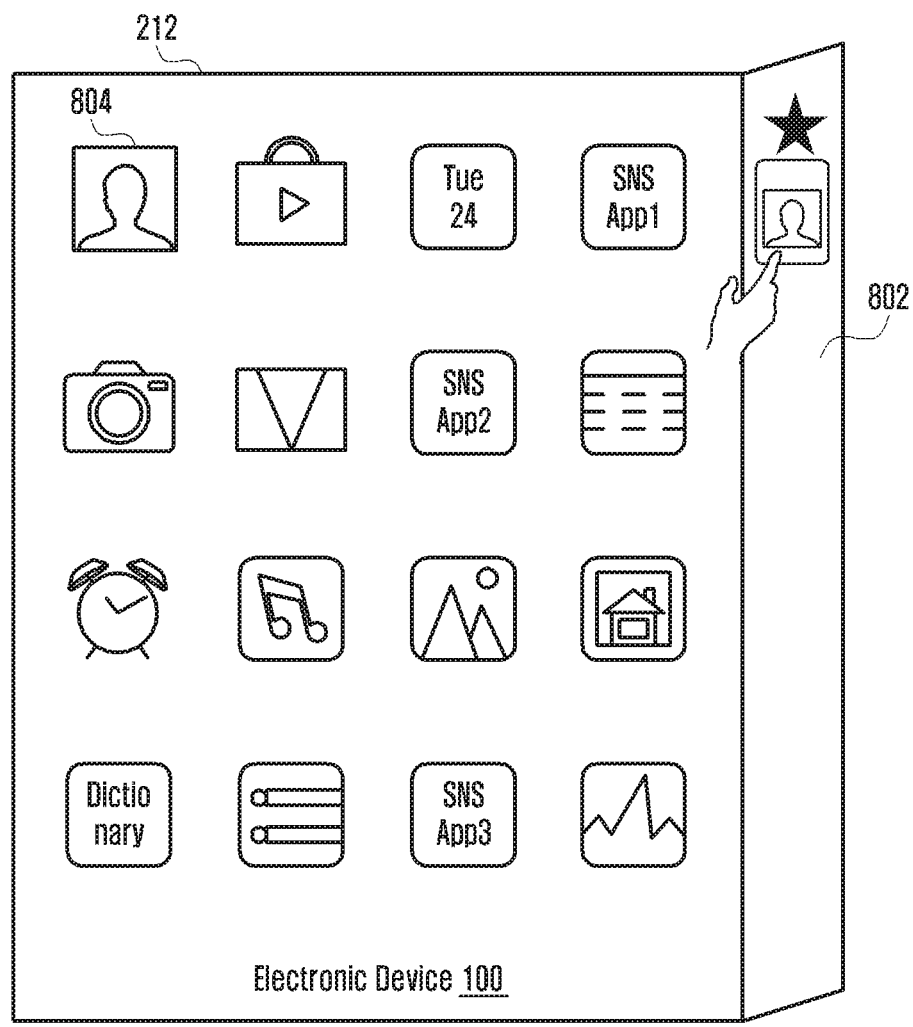

Further, referring to FIG. 8C, the second input of the tap gesture is performed on the contacts application icon 804 in the edge screen 802.

Figure 8D:
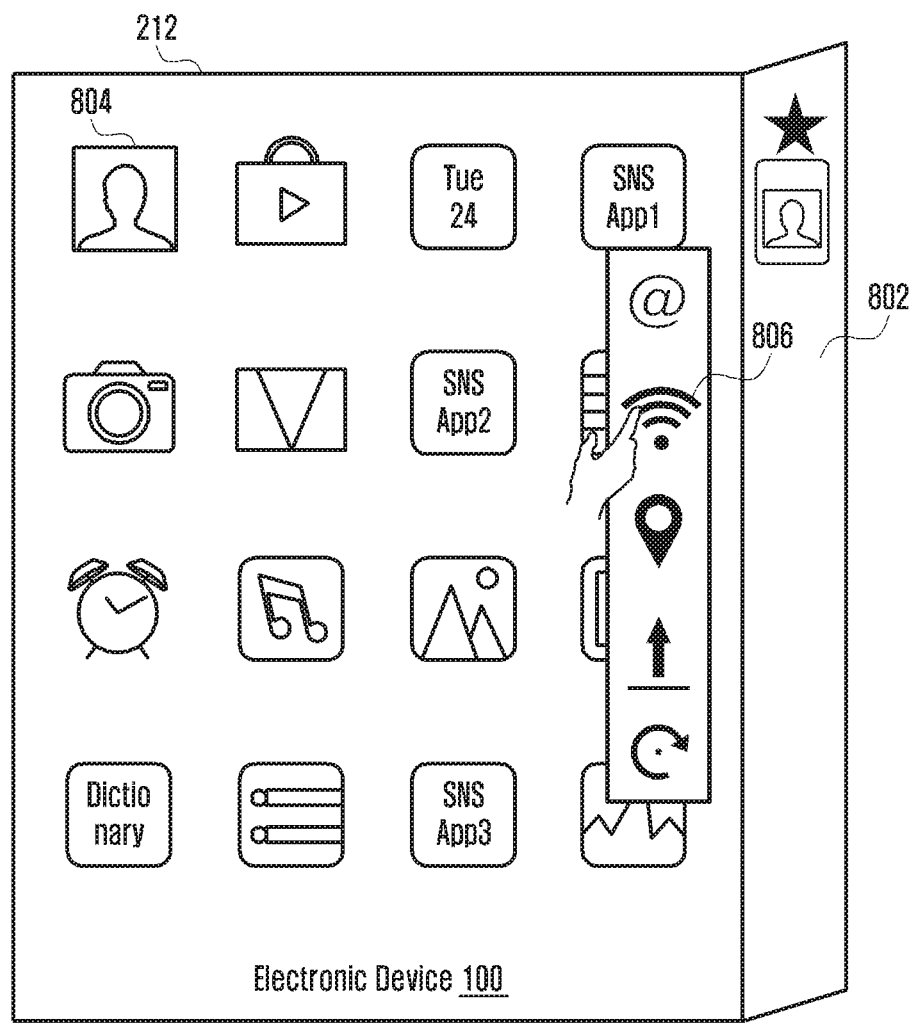

In an embodiment, referring to FIG. 8D, on detection of the tap gesture, a list of probable second applications 106 is displayed on the user interface 212 of the electronic device 100. Referring to FIG. 8D, the second application 106 may be dynamically associated with the first application 104 by performing the third input on the second application icon. Referring to FIG. 8D, the third input of the tap gesture is performed on the Wi-Fi application icon 806 to dynamically select the Wi-Fi application 806 as the second application 106. Accordingly, the contacts application and the Wi-Fi application may associated with each other, and the contacts application and the Wi-Fi application can be executed concurrently in response to detecting the first input and/or second input.

Figure 9A:
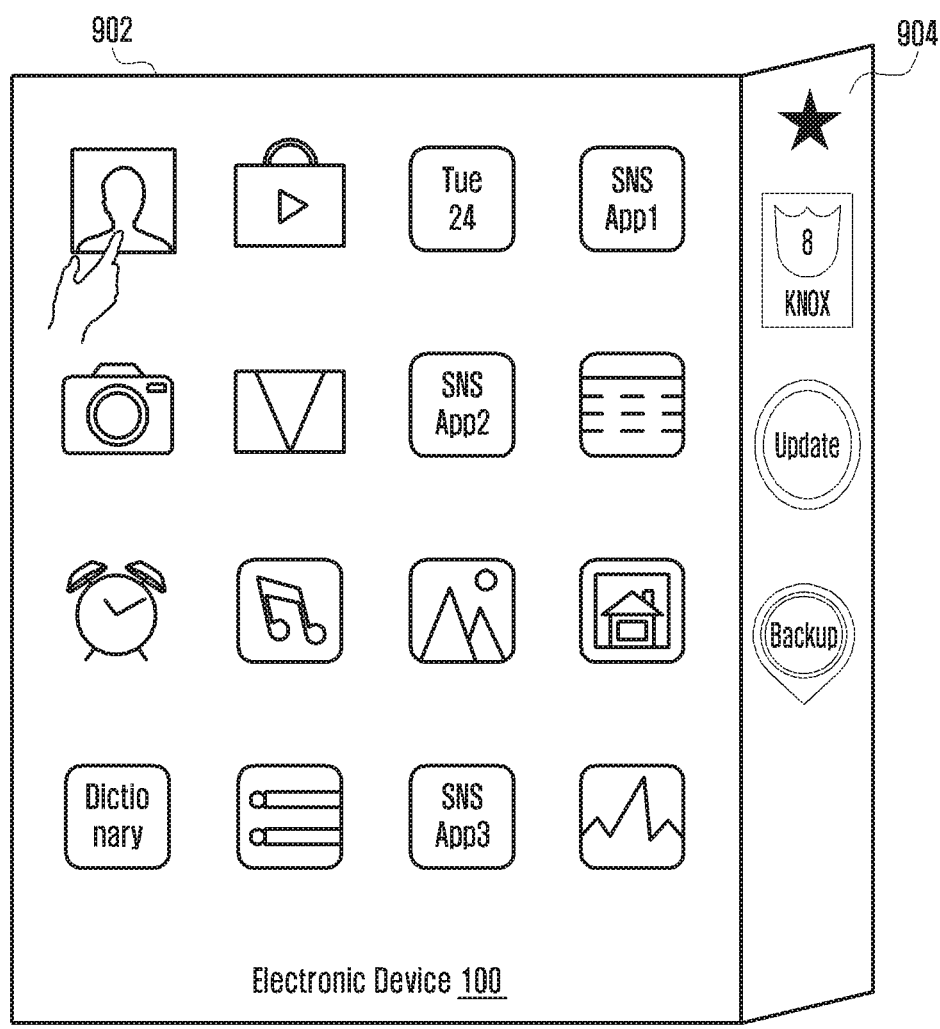
FIGS. 9A to 9C illustrate another example scenario of launching the contacts application along with at least one second application in an electronic device according to various embodiments of the present disclosure.
Figure 9B:
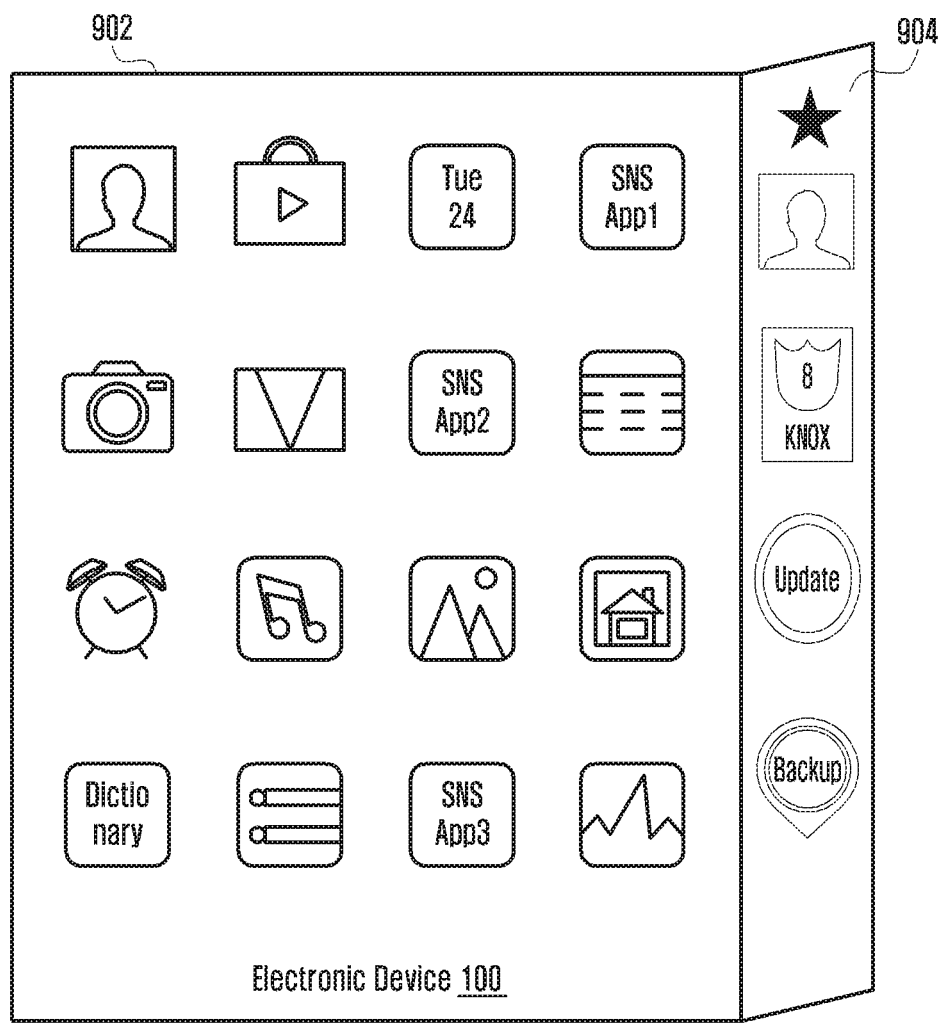
Figure 9C:
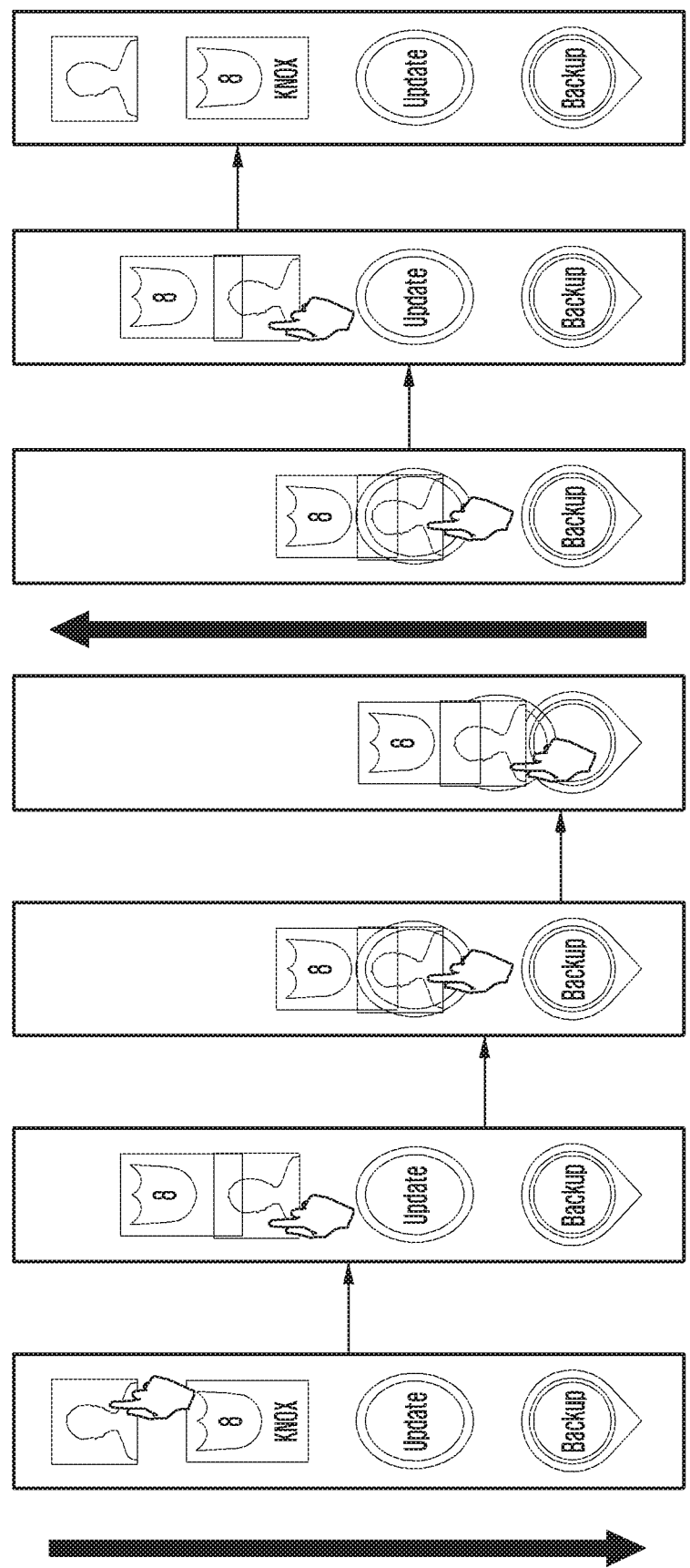

FIGS. 9A to 9C illustrate another example scenario of launching a contacts application along with at least one second application in an electronic device according to various embodiments of the present disclosure.

Referring to FIG. 9A, the first input of long press is performed on the contacts application icon 902. After performing the first input of long press on the contacts application icon 902, the edge screen 904 is highlighted (indicated by a star symbol at the top portion of the edge screen 904). In an embodiment, the nearest edge screen 904 relative to the position of the contacts application icon 902 may be highlighted or activated, if the electronic device 100 comprises of a dual edge display.

Also, the electronic device 100 displays a list of probable second applications 106 on the edge screen 904 of the electronic device 100. The second application 106 may be, for example, one of a KNOX mode, an update application, and a data backup application.

Referring to FIG. 9B, the contacts application icon 902 is dragged to the edge screen 904. The second application 106 may be dynamically associated with the first application 104 by performing the third input on the second application icon.

Referring to FIG. 9C, the third input of dragging the contacts application icon 902 onto any one the second applications icons is performed to select the second application 104. In an embodiment, multiple second applications 106 may be added or launched with the contacts application 902 by dragging the contacts application icon 902 in the downward direction.

The second application 106 associated with the contacts icon 902 may be unassociated from the contacts application 902 by dragging the contacts application icon in the upward direction off the second application icon.

In another embodiment (not shown in the FIG), the second application icon displayed on the edge screen 904 may be touched and dragged onto the contacts application icon 902 (i.e., the first application icon 102) to launch the second application 106 along with the contacts application.

Figure 10A:
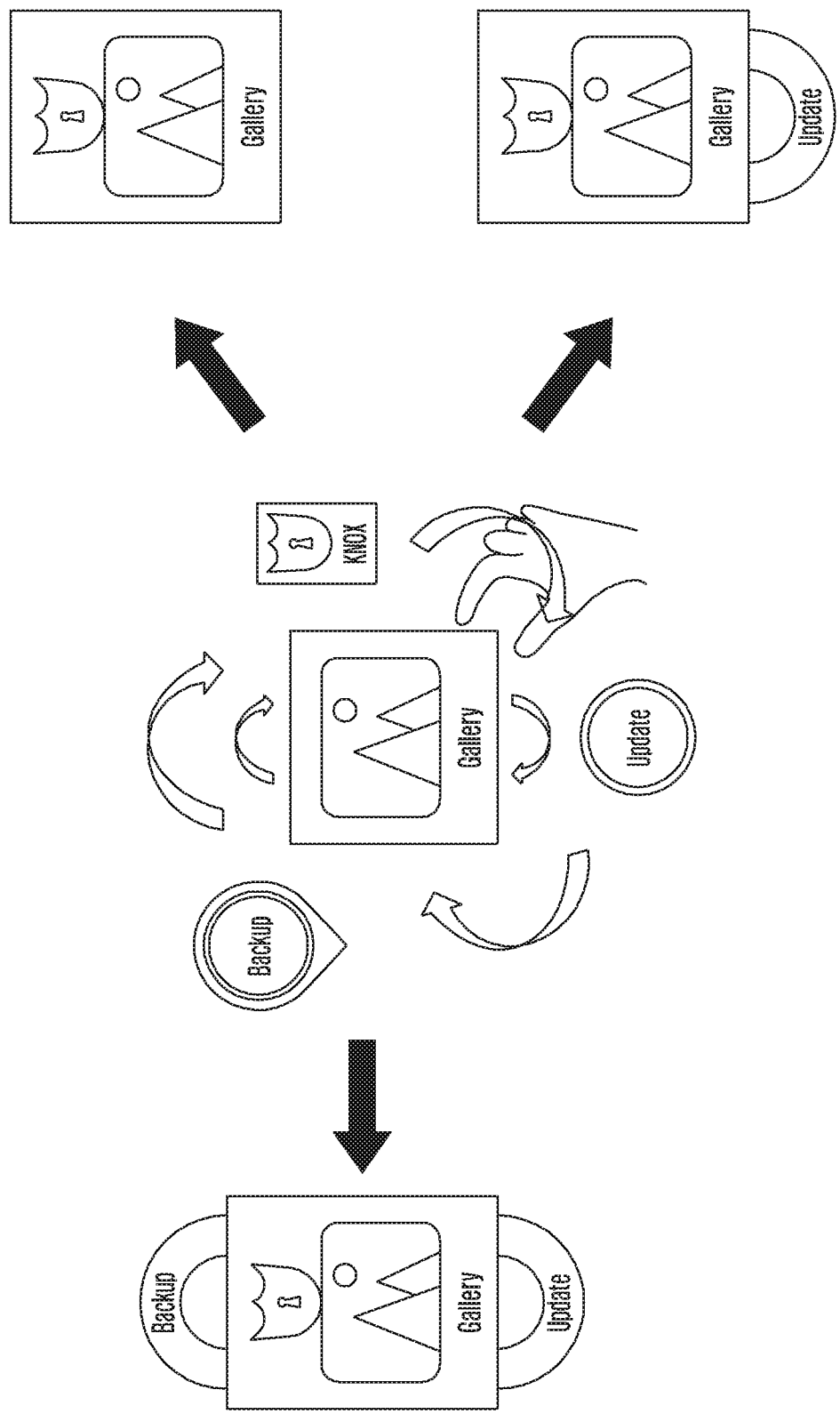
FIGS. 10A and 10B illustrate examples of a plurality of second applications invoked based on rotation of the first application icon according to various embodiments of the present disclosure.
Figure 10B:
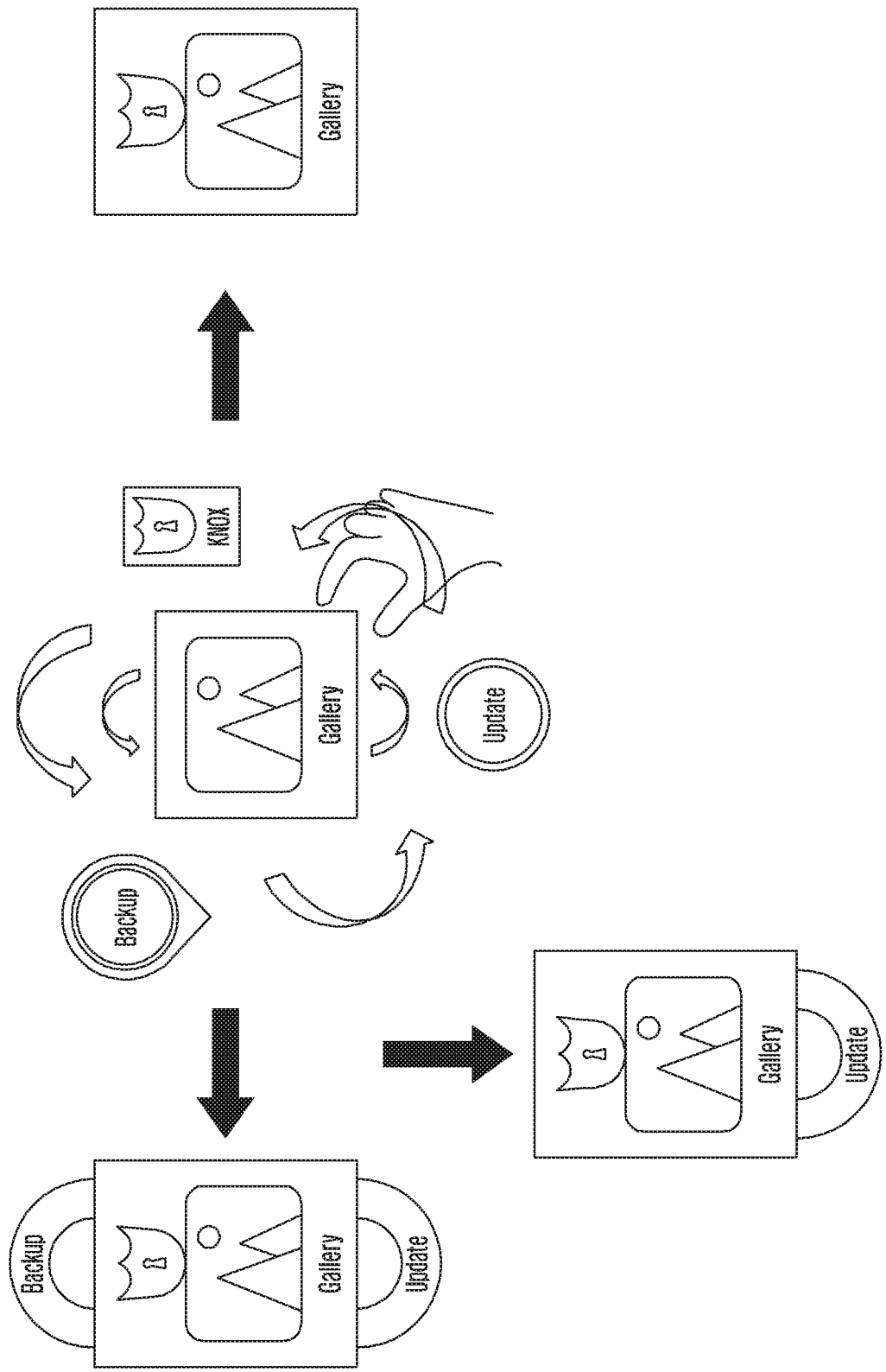

FIGS. 10A and 10B illustrate examples of a plurality of second applications invoked based on rotation of a first application icon according to various embodiments of the present disclosure.

Referring to FIG. 10A, the first application 104 is the gallery application. The gallery application icon is modified to display the second applications 106 associated with the gallery application. The second applications 106 may be one of the KNOX mode, the update application, and the backup application. In an embodiment, a plurality of the second application icons displayed surrounding the first application icon may be in a predetermined degree with the first application icon. As described in FIG. 10A, a KNOX application icon is located 60 degrees clockwise, an update application icon is located 180 degrees clockwise, and a backup application icon is located 300 degrees clockwise from the top of the gallery application icon. In an embodiment, each of the second application icons can be displayed concurrently when the touch on the first application icon is initiated, or can be displayed sequentially based on the rotate gesture. Further, the first application icon can be rotated with the rotate gesture.

In an embodiment, the second application 106 is located at the rotation degree of the first input, according to changing of rotation degree of the first input. For example, the KNOX application can be executed when a multi-touch is initiated on the gallery application icon, the gallery application icon is rotated clockwise 60 degrees, and the touch is released. Similarly, the update application is executed when the touch is rotated 180 degrees and released and the backup application is executed when the touch is rotated 300 degrees and released. At this time, the second application can be executed with the first application concurrently.

In an embodiment, the electronic device 100 may execute a plurality of second applications located within the rotate degree of the first input, when the first input, which is a rotate gesture, is performed. For example, after initiating a multi-touch on the gallery application icon, rotating 180 degrees clockwise, pass 60 degrees clockwise, and releasing the touch, the KNOX application and update application (the second application), which are located between the 60 and 120 rotation degrees are executed concurrently with the gallery application (the first application). That is, the gallery application may be executed with the KNOX mode, and the update of the gallery application may be executed on background concurrently with the KNOX mode of the gallery application.

In an embodiment, the action corresponding to the first input may include performing the sub function of the first application. For example, the sub function may include an update or back up of data of the first application 104. For example, updating the first application can be preconfigured to when a multi-touch initiated on the first application is rotated 45 degrees and released and backing up the data of the first application can be preconfigured to when a multi-touch initiated on the first application is rotated 90 degrees and released. In an embodiment, the controller module 202 of the electronic device 100 may store information relating to the sub function of the first application corresponding to the first input based on the user's input. And, the controller module 202 can perform the corresponding sub function based on the input pattern performed on the display module 210.

In an embodiment, an action corresponding to the first input may include changing the operation mode and/or environment setting preconfigured corresponding to the first input and executing the first application. The operation mode may include the KNOX mode and private mode. The environment setting may include enabling the first application 104 to share the data related to the first application 104 with another device by paring with another device. For example, rotating a multi-touch initiated on the first application 45 degrees and releasing the touch can be configured to executing the first application in the KNOX mode and rotating a multi-touch 90 degrees and releasing the touch can be configured to executing the first application in the private mode. In addition, rotating a multi-touch initiated on the first application 135 degrees and releasing the touch can be configured to sharing data (e.g., image data of the gallery application) related to the first application with an external device.

After performing the first input of the rotate gesture, the second applications 106 may be launched together with the gallery application based on the rotation of the gallery application icon. When the gallery application icon is rotated in the clockwise direction, the second applications 106 are added based on a degree and/or direction of the rotation. Referring to FIG. 10A, the KNOX mode is added to the gallery application, and the update application is added to the gallery application. The gallery application icon is modified based on the second application 106 added to the gallery application to display the second applications 106 added to the gallery application.

Referring to FIG. 10B, as the gallery application icon is rotated in the counter-clockwise direction, the second applications 106 are removed and the gallery application icon is modified accordingly.

Figure 11A:
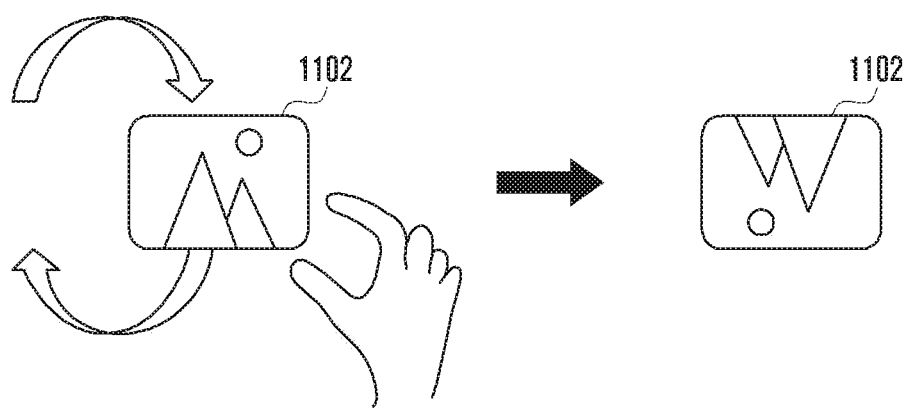
FIGS. 11A to 11C illustrate examples of a plurality of first inputs performed on an application icon associated with a first application in the electronic device according to various embodiments of the present disclosure.
Figure 11B:
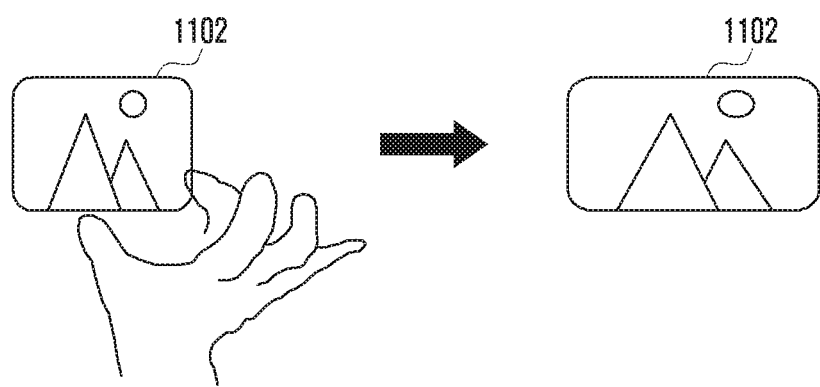
Figure 11C:
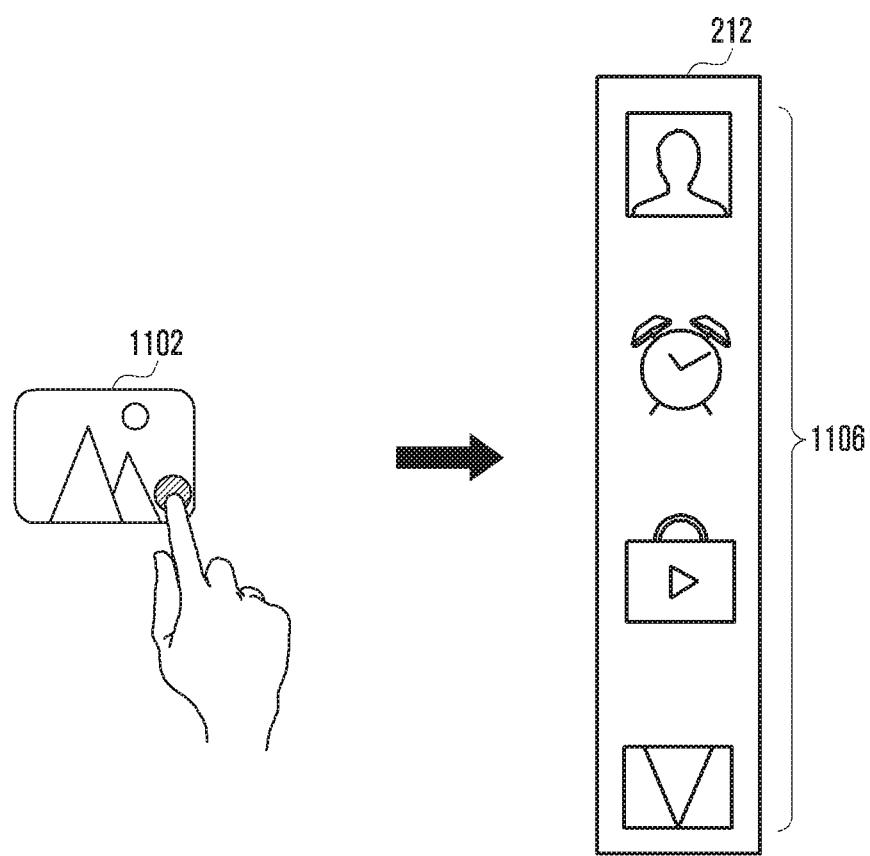

FIGS. 11A to 11C illustrate examples of a plurality of first inputs performed on an application icon associated with a first application in an electronic device according to various embodiments of the present disclosure.

In an embodiment, the controller module of the electronic device 100 may change the first application icon visually, in response to detecting the first input performed on the first application icon.

Referring to FIG. 11A, the first input is the rotate gesture. After detecting the rotate gesture, the gallery application icon 1102 is modified to change the orientation of the gallery application icon 1102.

Referring to FIG. 11B, the first input is the zoom (pinch-out) gesture. After detecting the zoom gesture, the gallery application icon 1102 is modified to display the gallery application icon 1102 in a stretched form.

Referring to FIG. 11C, the first input is the tap gesture. After detecting the tap gesture, a list of second icons 1106 corresponding to probable second applications 106 is displayed on the user interface 212 of the electronic device 100. The list of probable second applications 106 may be generated based on a number of parameters known in the art, such as user habits, application permissions, or other known recommendation methods.

Figure 12A:
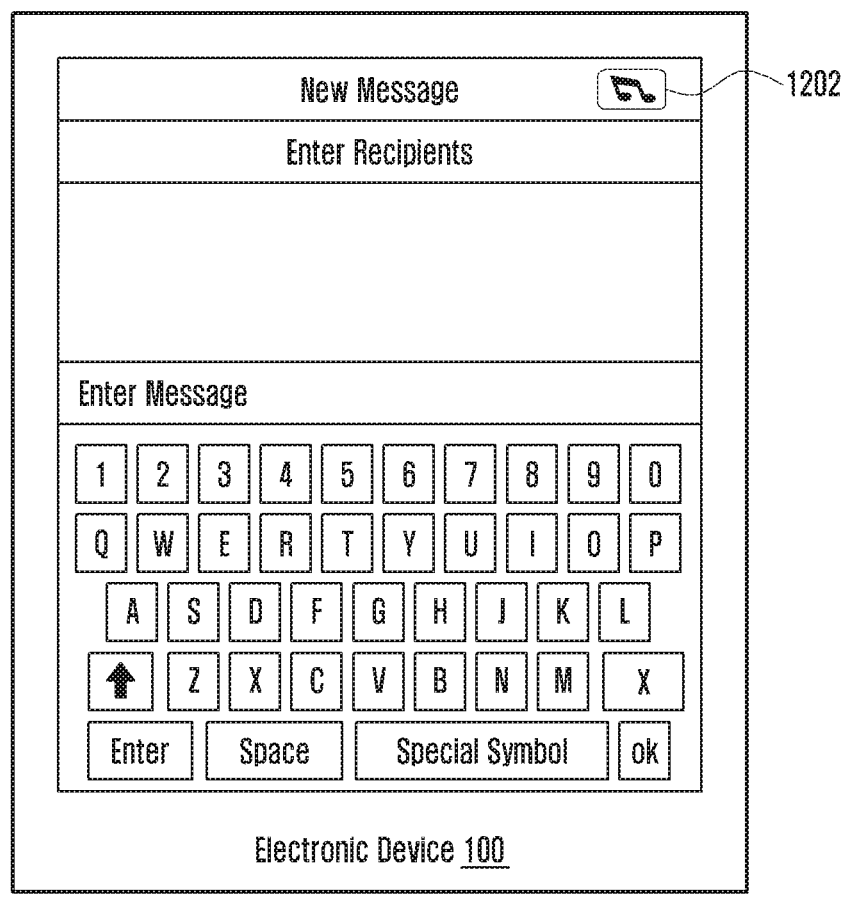
FIGS. 12A and 12B illustrate an example scenario for launching of a music player application (second application) along with a message application (first application) in an electronic device according to various embodiments of the present disclosure.
Figure 12B:
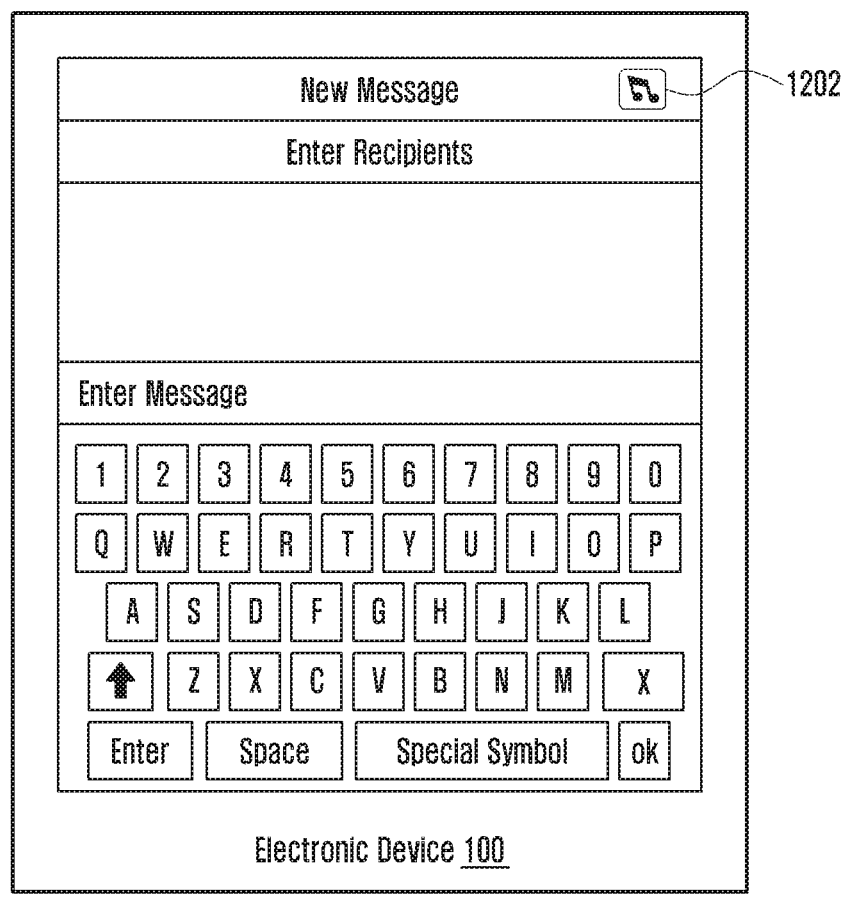

FIGS. 12A and 12B illustrate an example scenario for launching a music player application (second application) along with a message application (first application) in an electronic device according to various embodiments of the present disclosure.

Referring to FIG. 12A, after detecting the first input and the second input performed on the message application icon, the associated second application 106 (the music player application) is launched along with the message application. When the message application is open, the music player application may be active in the background. The music player application icon 1202 is displayed in the stretched form in the top corner of the display of the message application.

Further, referring to FIG. 12B, when the music player application icon 1202 is compressed using a user gesture (for example, pulling the music player application icon towards the center on the display, and reshaped to its original size, the music player application is closed and the music player application icon 1202 is removed from the display.

Figure 13A:
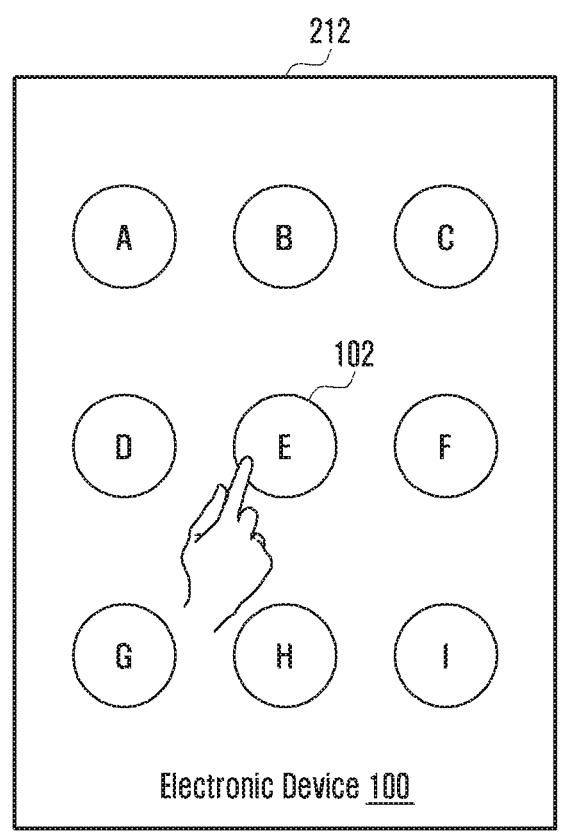
FIGS. 13A and 13B illustrate an example scenario of rearrangement of a plurality of second applications on detection of a first input on a first application icon according to various embodiments of the present disclosure.
Figure 13B:
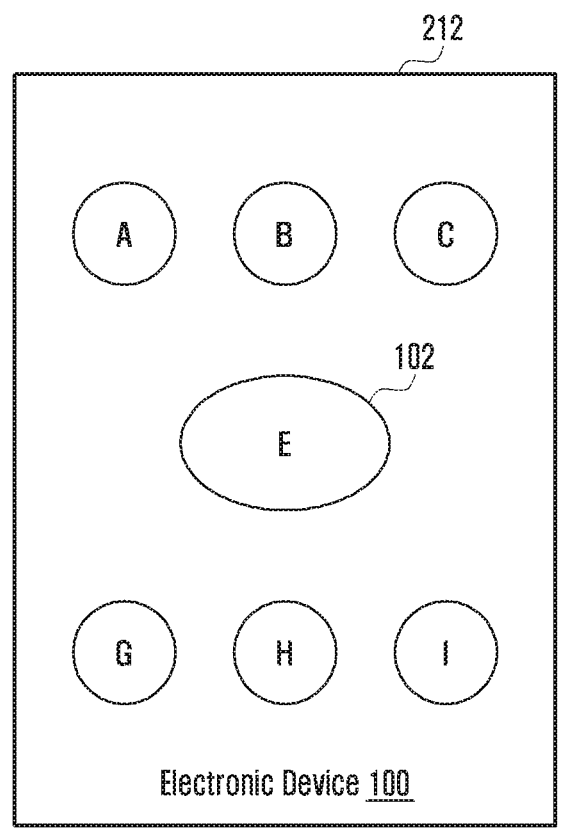

FIGS. 13A and 13B illustrate an example scenario of rearrangement of second icons corresponding to a plurality of second applications on detection of a first input on a first application icon according to various embodiments of the present disclosure.

Referring to FIG. 13A, after detection of the first input of the long press on the first application icon 102 corresponding to the first application 104 'E', the surrounding second application icons are rearranged and resized to provide more space on the user interface 212 for the first application icon 102.

Referring to FIG. 13B, the first application icon 102 is in the stretched form and is surrounded by remaining second application icons which are resized and rearranged. Thus, the user interface 212 is modified in order to provide more space for the first application icon 102. Further, the second input may now be easily performed on the first application icon 102.

Figure 14A:
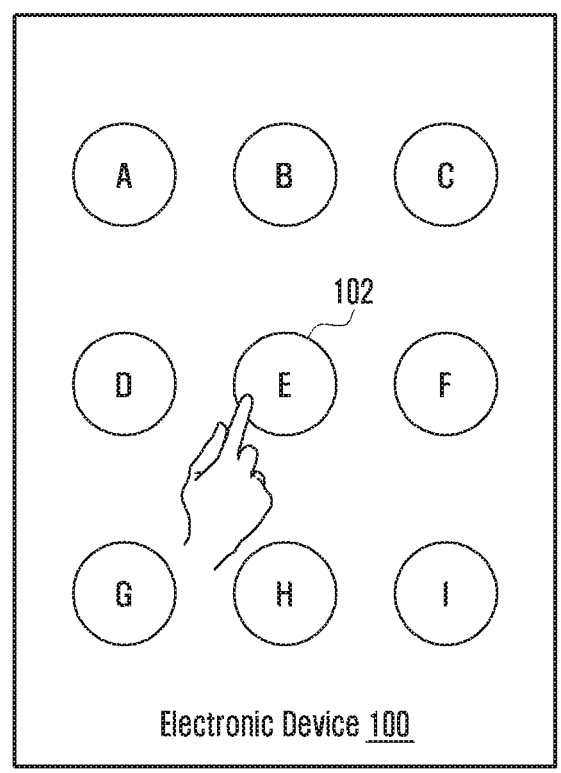
FIGS. 14A to 14C illustrate another example scenario of launching a second application along with a first application, wherein the second application is selected from a plurality of second application icons displayed as a ring on an electronic device according to various embodiments of the present disclosure.
Figure 14B:
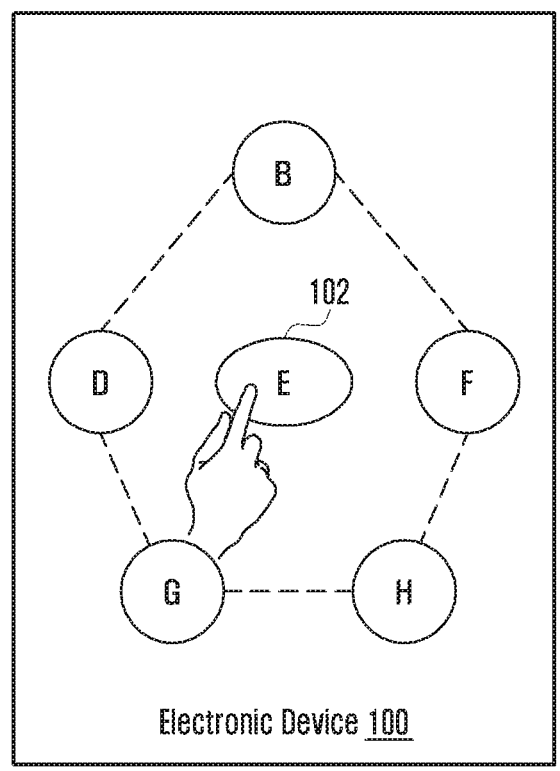
Figure 14C:
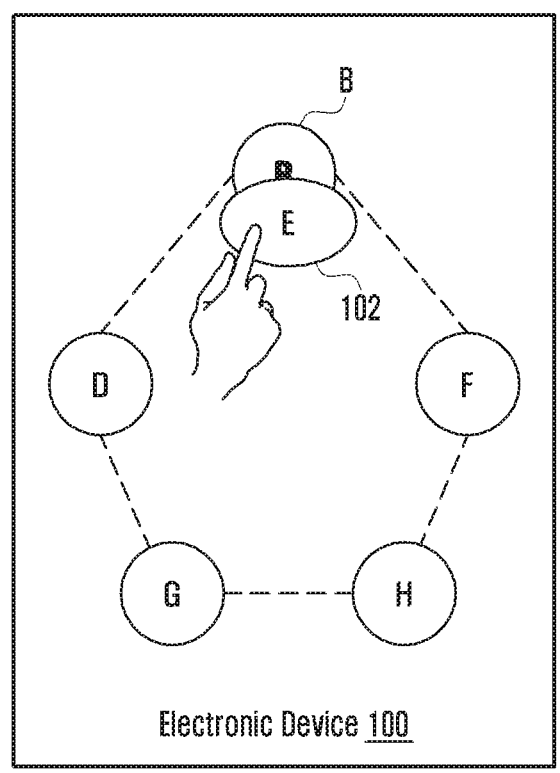

FIGS. 14A to 14C illustrate another example scenario of launching a second application along with a first application, wherein the second application is selected from a plurality of second application icons displayed as a ring on an electronic device according to various embodiments of the present disclosure.

Referring to FIG. 14A, the first input of the tap gesture is detected. Further, referring to FIG. 14B, on detection of the first input of the tap gesture or the long press on the first application icon 102, a ring of second application icons corresponding to probable second applications 106 is formed surrounding the first application icon 102. Further, referring to FIG. 14C, one of the applications corresponding to a second application icon in the ring may be associated with the second application 106 by performing the third input on the first application icon 102. Referring to FIG. 14C, the first application icon 102, corresponding to the first application 104 'E', is dragged over the second application icon corresponding to the second application 106 'B'.

Figure 15:
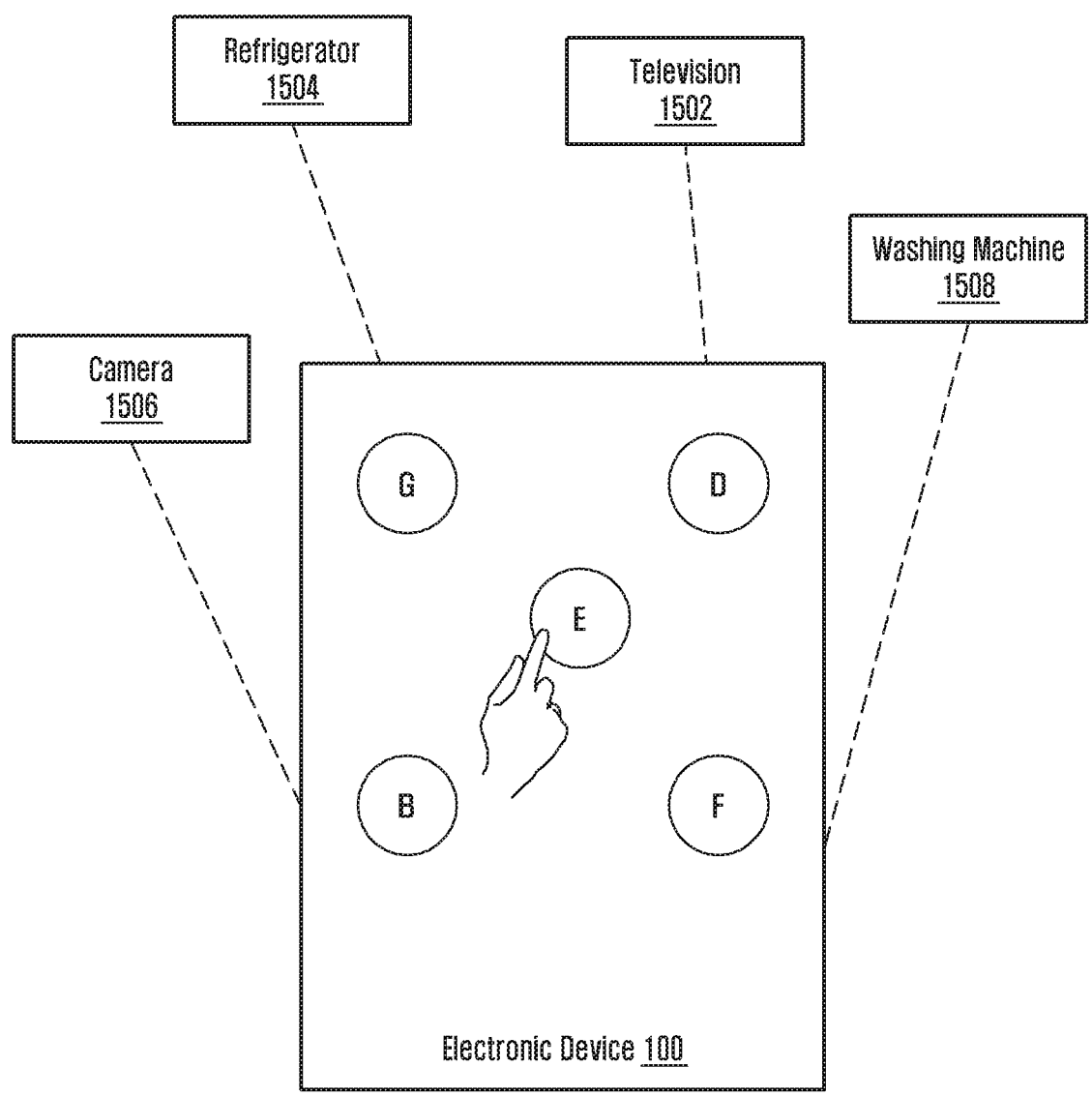
FIG. 15 illustrates another example scenario of launching a second application along with a first application, wherein the second application is presented from connected home networking devices according to various embodiments of the present disclosure.

FIG. 15 illustrates another example scenario of launching a second application along with a first application, wherein the second application is presented from connected home networking devices according to various embodiments of the present disclosure.

Referring to FIG. 15, the second application 106 is an application associated with any home networking device paired or connected with the electronic device 100. The second application icons corresponding to the second applications 106 associated with the connected home networking devices are displayed on the user interface 212 of the electronic device 100 based on locations of the home networking devices relative to the electronic device 100. The location of the home networking devices may be detected, for example, based on the direction of location of the home networking devices by magnetic sensors installed in the electronic device 100.

The second applications 106 associated with the home networking devices may include the home theatre application, the screen mirroring application in the television, and the like. The home networking device devices may include the television 1502, a refrigerator 1504, a washing machine 1508, a camera 1506, or the like. In an event of display of second application icons corresponding to the second applications 106 related to the home networking devices, an indication may be provided on the second application icons corresponding to the second applications 106 of the home networking devices to indicate that an action is going to be performed on the second application 106 native to a particular home networking device.

Figure 16A:
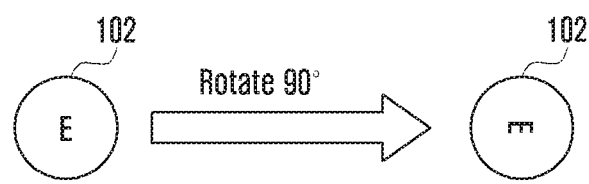
FIGS. 16A and 16B illustrate an example scenario of categorization of a first input based on the degree of rotation of a first application icon according to various embodiments of the present disclosure.
Figure 16B:
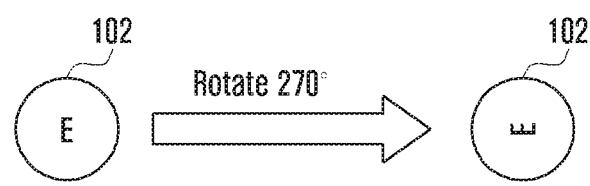

FIGS. 16A and 16B illustrate an example scenario of categorization of a first input based on a degree of rotation of a first application icon according to various embodiments of the present disclosure.

Referring to FIG. 16A, the first input is categorized based on the degree of rotation of the first application icon 102. The degree of rotation of the first application icon 102 may be provided as an input to the second application 106. The second application 106 may be launched based on the degree of rotation of the first application icon 102.

For example consider that the second application 106 is the data backup application. When the degree of rotation of the first application icon 102 is 90° and the tap gesture is detected, the electronic device 100 may be configured, for example, to perform data backup of one day. Further, when the degree of rotation of the first application icon 102 is 270° and the tap gesture is detected, the electronic device 100 may be configured, for example, to instead perform data backup of 5 days. Such settings for selective execution of the second application 106 based on degree of rotation may be predefined by the user.

A method for launching an application in an electronic device according to various embodiments of the present disclosure may include displaying an first application icon corresponding to an first application on the electronic device; detecting a first input performed on the displayed first application icon; and performing an action corresponding to the first input, in response to detecting the first input, and wherein the action corresponding to the first input comprises visually changing the first application icon is provided.

According to various embodiments, the first input may include touch and rotate the first application icon, and the visually changing the first application icon may include changing an orientation of the first application icon corresponding to a degree of rotation of the first input.

According to various embodiments, the action corresponding to the first input may include executing the first application and a second application associated with the first application, in response to releasing the first input.

According to various embodiments, the method may further include displaying a plurality of second application icons surrounding the first application icon in a predetermined degree, and the executing the second application may include executing the second application located corresponding to the degree of rotation of the first input.

According to various embodiments, the executing the first application and the second application may include at least one of: displaying each of the executed first application and the second application in each window in a multi window environment; and executing the first application in a foreground and the second application in a background.

According to various embodiments, the action corresponding to the first input may include at least one of: performing a sub function of the first application; and executing the first application by changing a operation mode and/or an environment setting preconfigured corresponding to the first input.

According to various embodiments, the method may further include detecting a second input performed on the visually changed first application icon; and executing the first application and a second application associated with the first application, in response to detecting the second input.

According to various embodiments, the method may further include changing at least one of a location and size of at least one icon located surrounding the first application icon, in response to visually changing the first application icon.

According to various embodiments, the method may further include detecting a third input performed on the displayed first application icon and/or at least one second application icon; and associating the first application with at least one second application corresponding to the at least one second application icon, in response to detecting the third input.

According to various embodiments, the third input may include dragging the first application icon to a predetermined region on a screen of the electronic device, and the first application corresponding to the dragged first application icon may be associated with the second application corresponding to the dragged second application icon.

According to various embodiments, the third input may be a touch input performed on the first application icon, and the method may further include displaying a list of at least one second application icon corresponding to at least one second application can be associated with the first application, in response to the touch input; and associating the first application with the at least one second application corresponding to the second application icon selected from the list.

An electronic device according to various embodiments of the present disclosure may include a display; and a controller configured to display an first application icon corresponding to an first application on the display; detect a first input performed on the displayed first application icon; and perform an action corresponding to the first input, in response to detecting the first input, and wherein the action corresponding to the first input may include visually changing the first application icon.

According to various embodiments, the first input may include touching and rotating the first application icon, and the controller may be configured to change an orientation of the first application icon corresponding to a degree of rotation of the first input.

According to various embodiments, the action corresponding to the first input may include executing the first application and a second application associated with the first application, in response to releasing the first input.

According to various embodiments, the controller may be configured to display, on the display, a plurality of second application icons surrounding the first application icon in a predetermined degree, and execute the second application located corresponding to the degree of rotation of the first input.

According to various embodiments, the controller may be configured to perform at least one of: displaying each of the executed first application and the second application in each window on the display in a multi window environment; and executing the first application in a foreground and the second application in a background.

According to various embodiments, the action corresponding to the first input may include at least one of: performing a sub function of the first application; and executing the first application by changing a operation mode and/or an environment setting preconfigured corresponding to the first input.

According to various embodiments, the controller may be configured to detect a second input performed on the visually changed first application icon, and execute the first application and a second application associated with the first application, in response to detecting the second input.

According to various embodiments, the controller may be configured to change at least one of a location and size of at least one icon located in surrounding of the first application icon, in response to visually changing the first application icon.

According to various embodiments, the controller may be configured to detect a third input performed on the displayed first application icon and/or at least one second application icon; and associate the first application with at least one second application corresponding to the at least one second application icon, in response to detecting the third input.

According to various embodiments, the third input may include dragging the first application icon to a predetermined region on a screen of the electronic device, and the controller may be configured to associate the first application corresponding to the dragged first application icon with the second application corresponding to the dragged second application icon.

According to various embodiments, the third input may be a touch input performed on the first application icon, and the controller may be configured to display a list of at least one second application icon corresponding to at least one second application that can be associated with the first application, in response to the touch input; and associate the first application with the at least one second application corresponding to the second application icon selected from the list.

Figure 17:
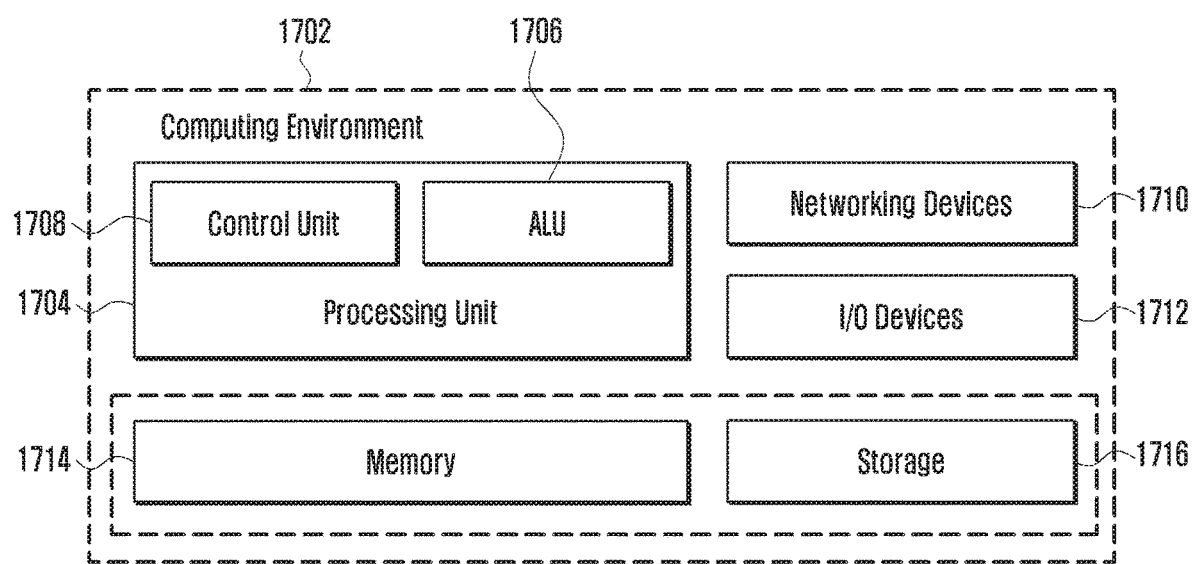
FIG. 17 illustrates a computing environment implementing the method for launching an application in an electronic device according to various embodiments of the present disclosure.

FIG. 17 illustrates a computing environment implementing a method for launching an application in an electronic device according to various embodiments of the present disclosure.

Referring to FIG. 17, a computing environment 1702 implementing the method for launching the application in the electronic device 100 is illustrated. As depicted, the computing environment 1702 includes at least one processing unit 1704 that is equipped with a control unit 1708 and an arithmetic logic unit (ALU) 1706, a memory 1714, a storage 1716, plurality of networking devices 1710 and a plurality input/output (I/O) devices 1712. The processing unit 1704 is responsible for processing the instructions of the technique. The processing unit 1704 receives commands from the control unit 1708 in order to perform its processing. Further, any logical and arithmetic operations involved in the execution of the instructions may be computed with the help of the ALU 1706.

The overall computing environment 1702 can be composed of multiple homogeneous or heterogeneous cores, multiple central processing units (CPUs) of different kinds, special media and other accelerators. The processing unit 1704 is responsible for processing the instructions of the technique. Further, the plurality of processing units 1704 can be located on a single chip or over multiple chips.

The technique comprising of instructions and codes required for the implementation are stored in either the memory 1714, the storage 1716, or both. At the time of execution, the instructions can be fetched from the corresponding memory 1714 or storage 1716, and executed by the processing unit 1704.

In case of any hardware implementations, various networking devices 1710 or external I/O devices 1712 can be connected to the computing environment to support the implementation through a networking unit and an I/O device unit.

The various embodiments disclosed herein can be implemented through at least one software program running on at least one hardware device and performing network management functions to control the elements. FIGS. 1 to 17 include blocks which can be at least one of a hardware component or a combination of hardware device and software components.

While the present disclosure has been shown and described with reference to various embodiments thereof, it will be understood by those skilled in the art that various changes in form and details may be made therein without departing from the spirit and scope of the present disclosure as described by the appended claims and their equivalents.

What is claimed is:

1. A method for launching an application in an electronic device, the method comprising:
displaying a first application icon corresponding to a first application on the electronic device;
detecting a first input performed on the displayed first application icon;
in response to the detecting of the first input including a rotation gesture on the first application icon, visually changing at least one of at least part of the first application icon or at least one visual item surrounding the first application icon; and performing an action corresponding to the first input,
wherein the action corresponding to the first input comprises at least one of:
performing a sub function among a plurality sub functions of the first application corresponding to a rotation angle of the first input, each of the plurality sub functions corresponding to a different rotation angle,
executing the first application by changing at least one of an operation mode among a plurality of operation modes or an environment setting preconfigured corresponding to the rotation angle of the first input, or
in a case of the at least one visual item surrounding the first application icon being a plurality of second application icons surrounding the first application icon in a predetermined degree, executing a second application corresponding to one of the plurality of second application icons corresponding to the rotation angle of the first input,
wherein the visually changing of the first application icon comprises changing an orientation of the first application icon about an axis that is perpendicular to the first application icon corresponding to the rotation angle of the first input, and
wherein the visually changing of the at least one visual item comprises changing at least one of a location or a size of the at least one visual item surrounding the first application icon according to the rotation angle of the first input.

2. The method of claim 1, wherein the performing of the action corresponding to the first input comprises performing the action in response to releasing the first input.

3. The method of claim 1, further comprising:
detecting a second input performed on the visually changed first application icon,
wherein the performing of the action comprises performing the action in response to the detecting of the second input.

4. The method of claim 1, further comprising:
detecting a third input performed on at least one of the displayed first application icon or at least one second application icon; and
associating the first application with at least one second application corresponding to the at least one second application icon, in response to the detecting of the third input.

5. The method of claim 4,
wherein the third input comprises dragging the first application icon to a predetermined region on a screen of the electronic device, and
wherein the first application corresponding to the dragged first application icon is associated with the at least one second application corresponding to the at least one second application icon based on the dragging of the first application icon.

6. The method of claim 4,
wherein the third input is a touch input performed on the first application icon, and
wherein the method further comprises:
displaying a list of at least one second application icon corresponding to at least one second application that can be associated with the first application, in response to the touch input, and
associating the first application with the at least one second application corresponding to the second application icon selected from the list.

7. An electronic device comprising:
a display; and
a controller configured to:
display a first application icon corresponding to a first application on the display,
detect a first input performed on the displayed first application icon,
in response to the detecting of the first input including a rotation gesture on the first application icon, visually change at least one of at least part of the first application icon or at least one visual item surrounding the first application icon, and
perform an action corresponding to the first input,
wherein the action corresponding to the first input comprises at least one of:
performing a sub function among a plurality sub functions of the first application corresponding to a rotation angle of the first input, each of the plurality sub functions corresponding to a different rotation angle,
executing the first application by changing at least one of an operation mode among a plurality of operation modes or an environment setting preconfigured corresponding to the rotation angle of the first input, or
in a case of the at least one visual item surrounding the first application icon being a plurality of second application icons surrounding the first application icon in a predetermined degree, executing a second application corresponding to one of the plurality of second application icons corresponding to the rotation angle of the first input,
wherein the visually changing of the first application icon comprises changing an orientation of the first application icon about an axis that is perpendicular to the first application icon corresponding to the rotation angle of the first input, and
wherein the visually changing of the at least one visual item comprises changing at least one of a location or a size of the at least one visual item surrounding the first application icon according to the rotation angle of the first input.

8. The electronic device of claim 7, wherein the controller is configured to perform the action in response to releasing the first input.

9. The electronic device of claim 7, wherein the controller is configured to:
detect a second input performed on the visually changed first application icon, and
perform the action in response to the detecting of the second input.

10. The electronic device of claim 7, wherein the controller is configured to:
detect a third input performed on at least one of the displayed first application icon or at least one second application icon, and
associate the first application with at least one second application corresponding to the at least one second application icon, in response to the detecting of the third input.

11. The electronic device of claim 10,
wherein the third input comprises dragging the first application icon to a predetermined region on a screen of the electronic device, and
wherein the controller is configured to associate the first application corresponding to the dragged first application icon with the at least one second application corresponding to the to the at least one second application icon based on the dragging of the first application icon.

12. The electronic device of claim 10,
wherein the third input is a touch input performed on the first application icon, and
wherein the controller is configured to:
display a list of at least one second application icon corresponding to at least one second application that can be associated with the first application, in response to the touch input, and
associate the first application with the at least one second application corresponding to the second application icon selected from the list.

\* \* \* \* \*